INVENTOR
CARL D. SOUTHARD

BY J. K. Mozer
AGENT

Oct. 27, 1959

C. D. SOUTHARD

DRIVE AND BIT COUNT CONTROL MEANS FOR DATA HANDLING MATRIX 2,910,235

Original Filed Nov. 18, 1954

22 Sheets-Sheet 4

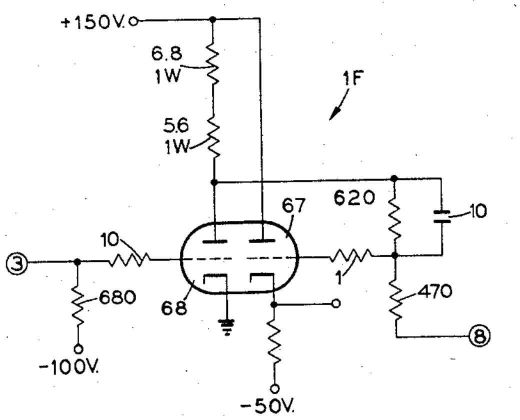
FIG. 24a
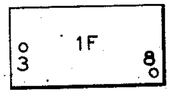
FIG. 24b
| | | | |
|---|---|---|---|
| 25a | 25c | 25e | 25g |
| 25b | 25d | 25f | 25h |
FIG. 26
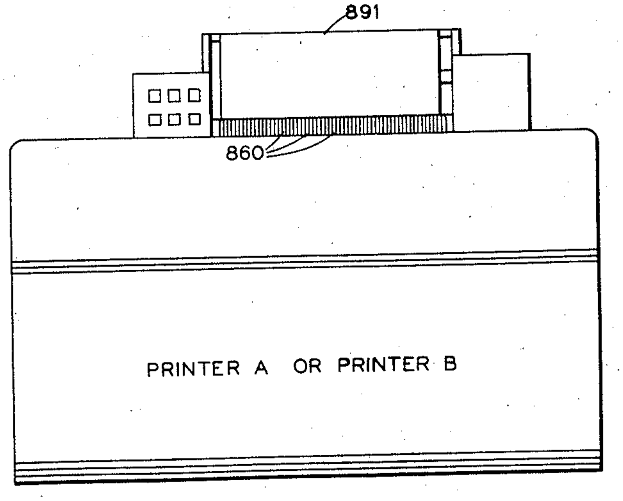
FIG. 27

Oct. 27, 1959 C. D. SOUTHARD 2,910,235

DRIVE AND BIT COUNT CONTROL MEANS FOR DATA HANDLING MATRIX

Original Filed Nov. 18, 1954 22 Sheets-Sheet 18

Oct. 27, 1959 C. D. SOUTHARD 2,910,235

DRIVE AND BIT COUNT CONTROL MEANS FOR DATA HANDLING MATRIX

Original Filed Nov. 18, 1954 22 Sheets-Sheet 22

United States Patent Office 2,910,235

Patented Oct. 27, 1959

2,910,235

DRIVE AND BIT COUNT CONTROL MEANS FOR DATA HANDLING MATRIX

Carl D. Southard, Endicott, N.Y., assignor to International Business Machines Corporation, New York, N.Y., a corporation of New York Original application November 18, 1954, Serial No. 469,592. Divided and this application October 15, 1956, Serial No. 616,048

12 Claims. (Cl. 235—153)

This invention relates to printing mechanisms and more particularly to printing mechanisms of the data processing type which are capable of processing data delivered from an external source.

This is a division of application Serial No. 469,592, filed November 18, 1954, entitled "Printer for Calculator Unit" and assigned to the assignee of the present invention.

In accordance with the invention, a differentially operable printing mechanism or machine of the type normally used for processing data recorded in tabulating cards is provided with a modified data processing means which receives the data to be processed a line at a time from an external source. Each line of data is divided into groups of words comprising a plurality of ordered positions, each having numeric characters 0 to 9, inclusive.

The data processing means includes a binary to decimal translator operated in timed relation with the normal machine digit cycle point positions. With a translator of this type, the entire line of data to be printed is serially delivered to the translator in binary code at each machine cycle point 9 through 0, however, only the binary coded pulses corresponding to the particular digit cycle point of the printing mechanism are accepted and serially transmitted from the translator as single pulses. All pulses, when selected, pass from the translator over a single conductor which in turn is connected to a word data switch forming a part of a print matrix comprising a group or array of tubes arranged in rows and columns to represent words and ordered positions in the word, respectively. The timing of the matrix is controlled by shift pulses delivered from the calculator to a closed fast ring for driving the columns which in turn drive an open slow ring for driving the rows. These two are interconnected so that at any point where coincidence occurs therebetween with a pulse received by the word switch from the translator that tube is fired. Firing of the tube energizes a print magnet connected thereto which in turn, after a mechanical delay, results in actuation of printing apparatus to cause the selected order in the word to initiate printing the desired numerical data or digit. As the machine moves to its next digit cycle point, the entire line of binary data is again delivered to the translator and the binary code for that cycle point is translated to its decimal value and transmitted in a like manner to fire the proper tube. In this manner the entire line is delivered to the translator once for each digit cycle point 9 through 0 or a total of ten times. At the end of the ten delivery operations, all binary stored data will have been delivered to the print matrix from which the printing means is actuated.

The setting up of all like digits in each word of the entire line corresponding to the digit cycle point of the printing mechanism is delivered serially but occurs substantially simultaneously. Thus, with the various digit cycle points moved from point to point in a consecutive manner, the corresponding digits are set up. After the last machine cycle point digits are completely set up and the proper delay for checking has transpired, the printing operation for the entire line of numeric information occurs substantially simultaneously.

In order to properly time the delivery of data to the translator, a control digit cycle point pulse or row signal is transmitted from the printer to the calculator or external source of information at each cycle point.

A bit count checking circuit is provided in the printer to insure the printing of the proper numeric data for each order in each word. This checking circuit comprises a plurality of cascade connected relays disposed in a bit count network circuit and includes relays for each order of each word which are energized upon actuation of the particular order in accordance with a preselected code and bit count. The interconnected relays are wired to provide a 4 modulus to cancel or cast out all bit counts divisible by four. The bit count value from the checking circuit representing the remainder is compared with a similar bit count delivered from the external source over the binary input lines to the translator along with each word. If the numeric bit count generated in the printer and the delivered bit count from the external source agree, the actual printing of the data takes place and continued operation of the printer is permitted, if not, an error is indicated and the printing mechanism is stopped and further information from the calculator will not be received until the error has been corrected. If desired, the bit count checking means may be shunted to permit printer operation even though an error is detected.

Accordingly, it is one of the objects of this invention to provide a data processing line printing mechanism operated on machine digit cycle points 9 through 0 with a binary to decimal translator synchronized therewith which serially transmits all like numeric values at each cycle point 9 through 0 to operate the printing mechanism.

It is anotner object to provide a binary to decimal translator with binary code input lines over which the bit count for binary coded data is transmitted.

It is still another object to provide a bit count for binary coded data transmitted to a binary to decimal serial translator which is transmitted along with the binary coded data.

Other objects of the invention will be pointed out in the following description and claims and illustrated in the accompanying drawings, which disclose, by way of example, the principle of the invention and the best mode, which has been contemplated, of applying that principle.

Figure 3A:
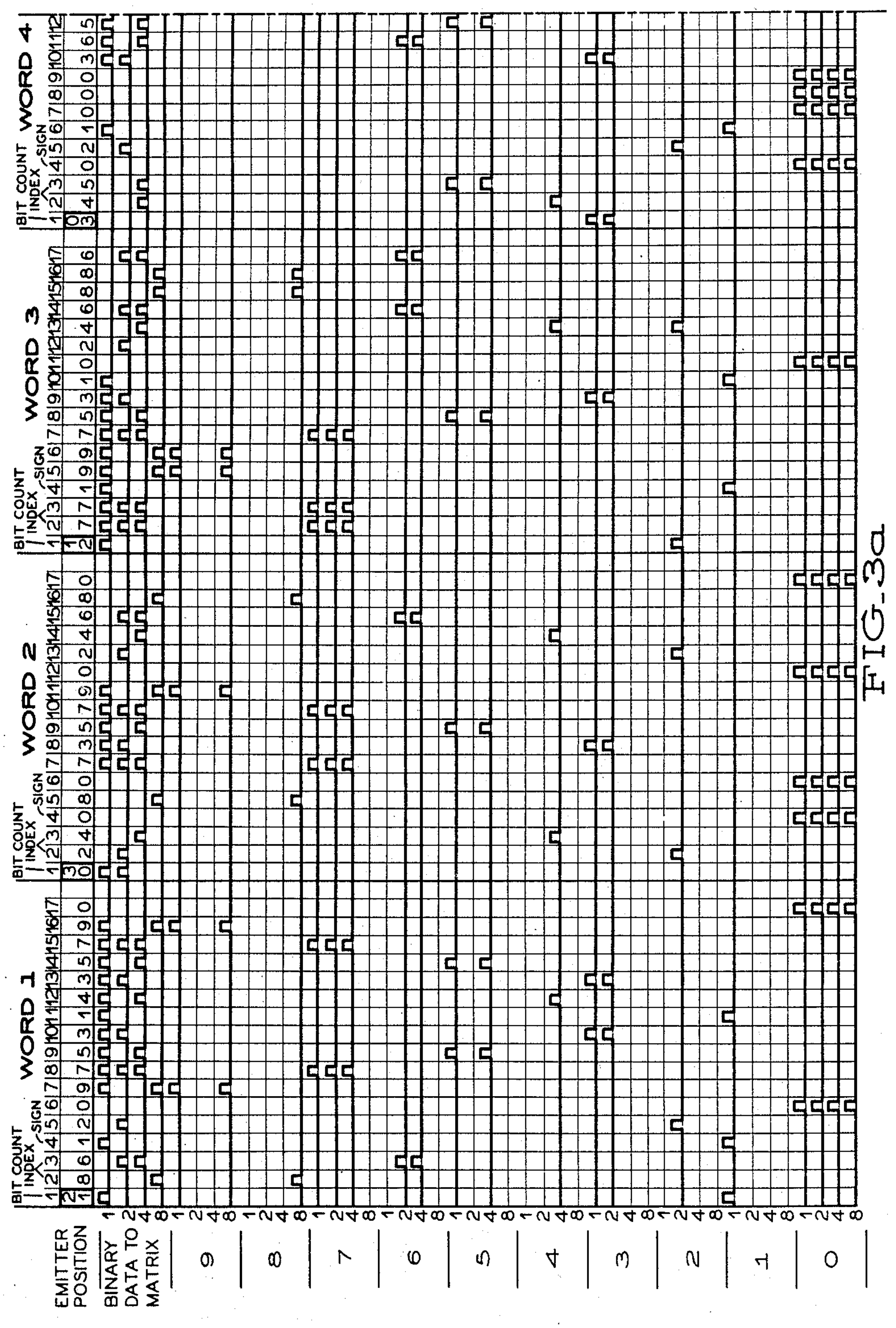
Figure 3B:
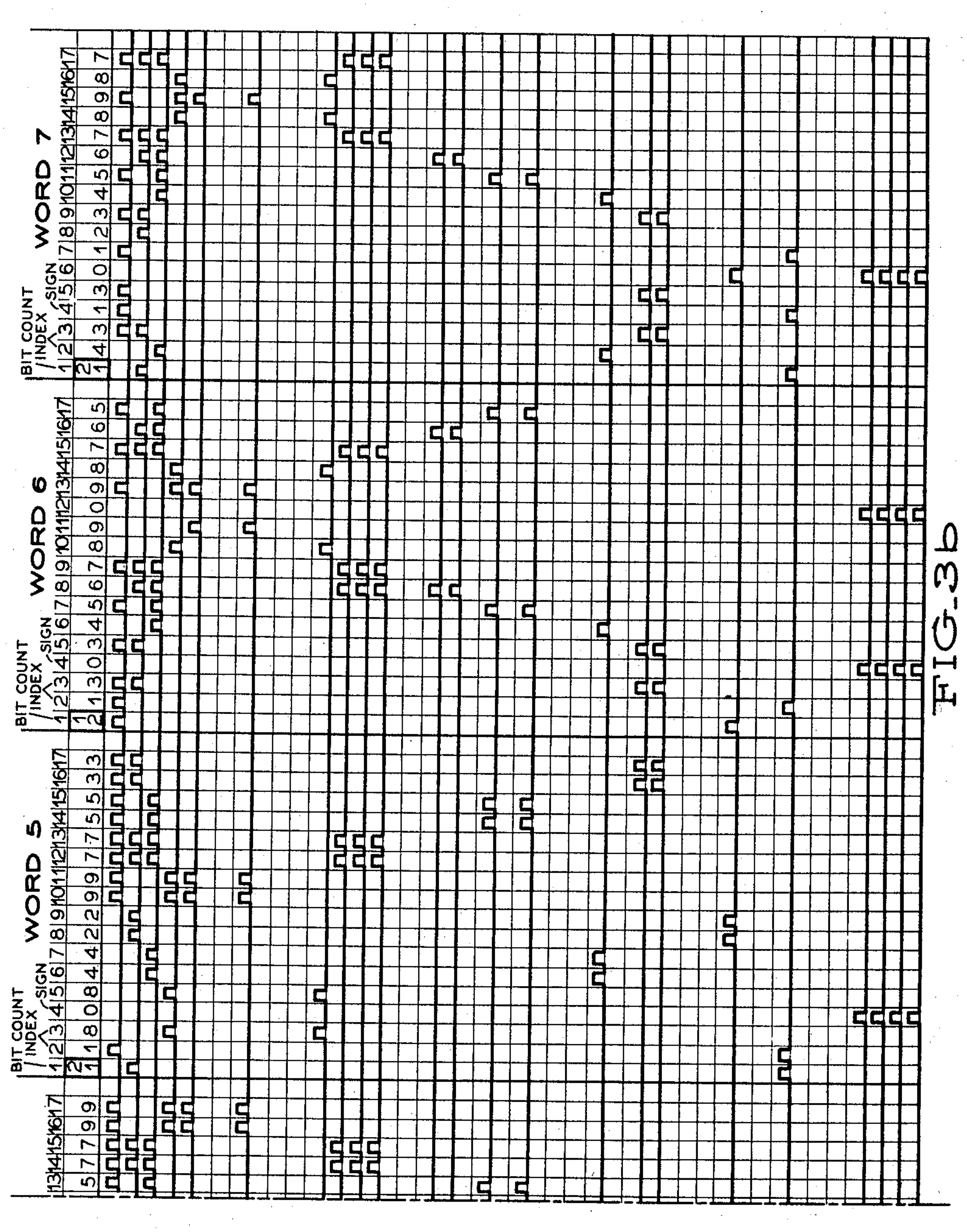

Figs. 3*a* and 3*b* taken together, with Fig. 3*a* to the left of Fig. 3*b*, comprise a timing diagram showing a group of words and ordered positions which comprise a line of numeric data or information.

Figures 4A, 4B:
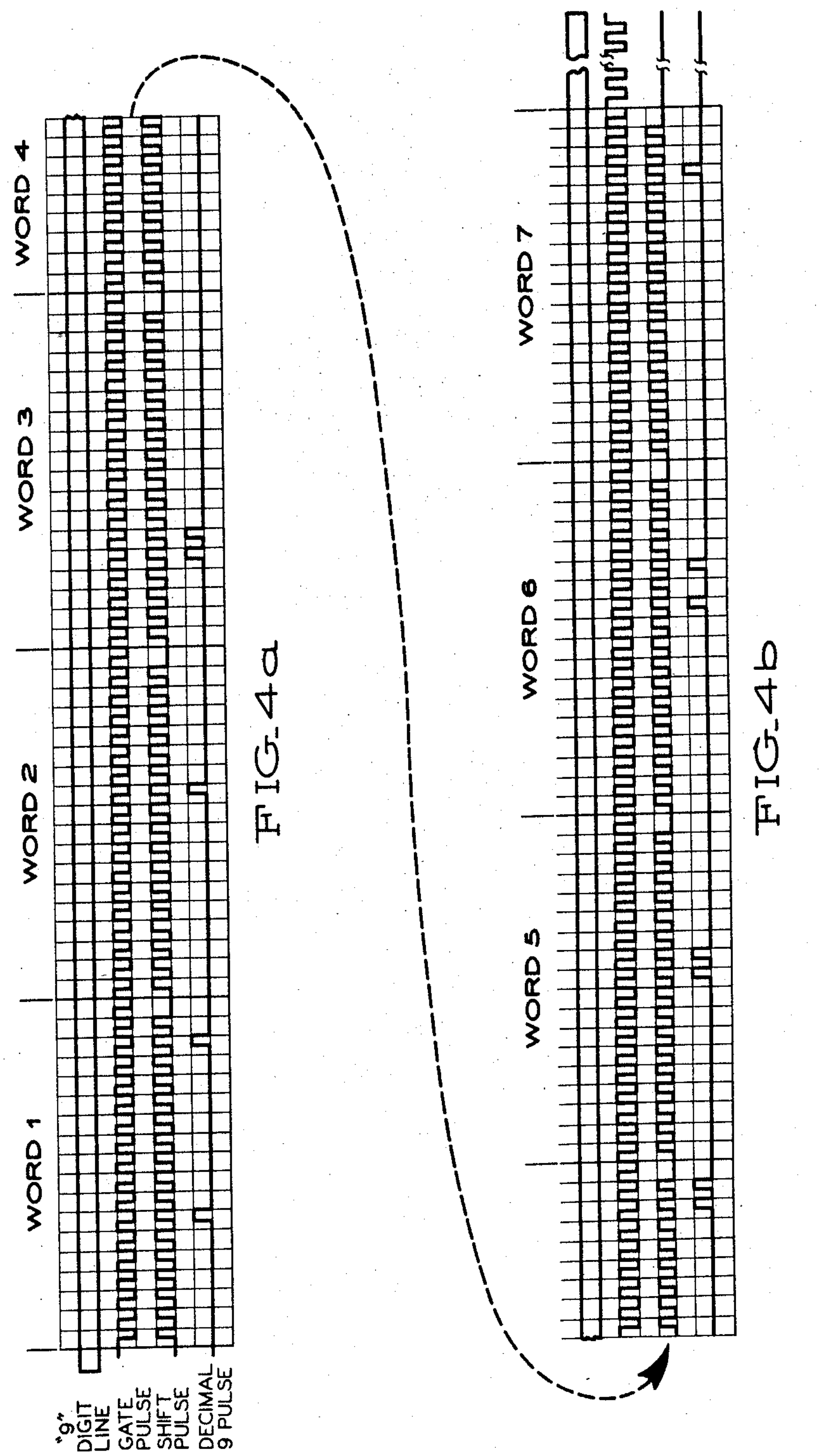

Figs. 4*a* and 4*b* taken, with Fig. 4*a* to the left of Fig. 4*b*, comprise a timing chart of a single machine cycle point of the printer with the relative position of the translated data at that cycle point in the form of serially spaced pulses delivered by the translator.

Figure 5:
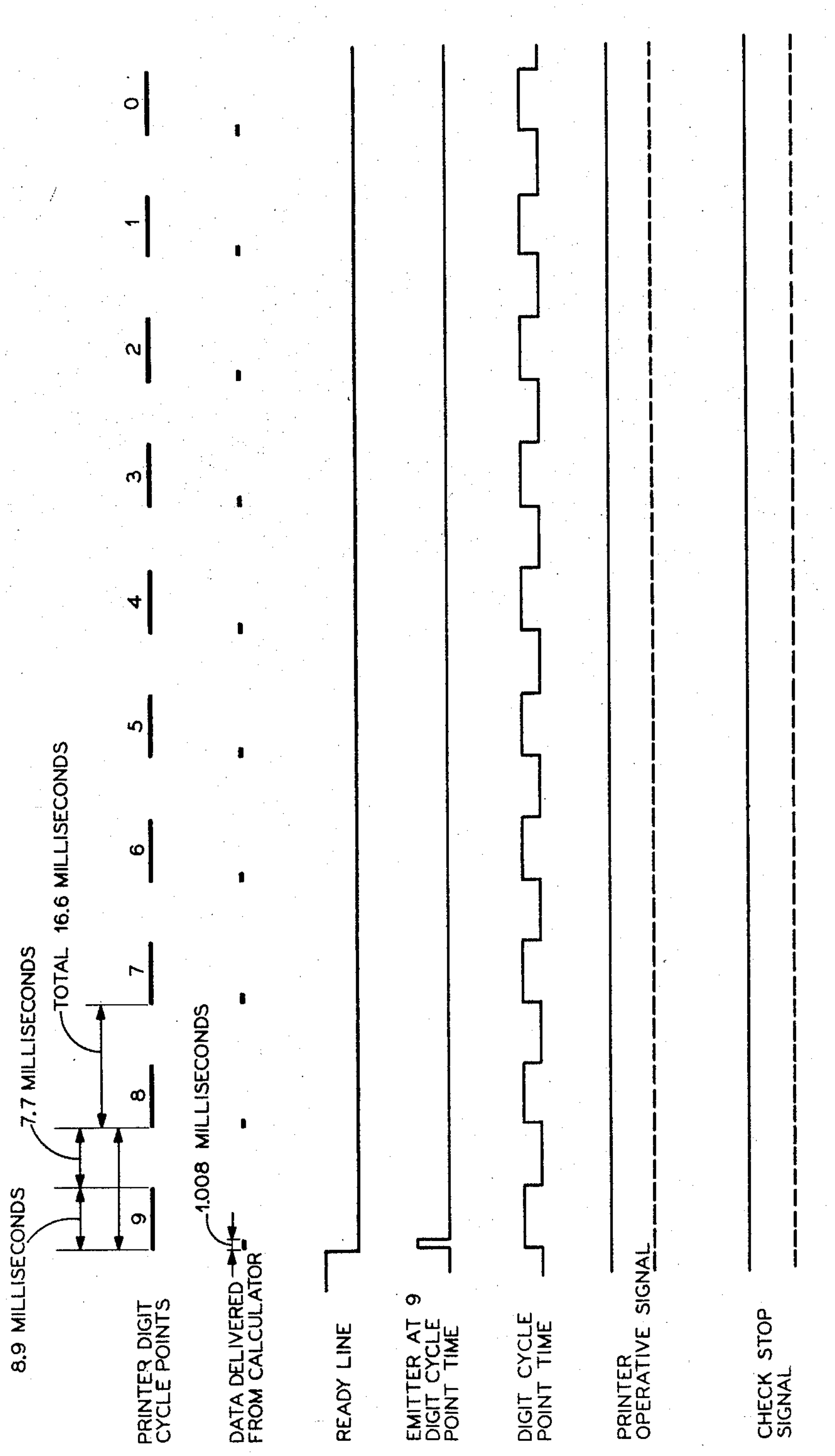

Fig. 5 discloses a timing diagram showing the various cycle points 9 through 0 and the pulses generated to indicate the printer is ready to accept data from the external source.

Figs. 6*a*, 6*b*, 7*a*, 7*b*, 8*a* and 8*b* diagrammatically show various types of diode coincidence switches or "and" circuits and diode mixes or "or" circuits used in the printer control circuit.

Figs. 9*a*, 9*b* through 24*a* and 24*b* are schematic representations of tube circuit elements which are shown in the various block diagrams as used in the printer control circuit.

Figs. 25*a* to 25*h*, inclusive, taken together comprise a wiring diagram for processing the data delivered from the calculator and controlling the printer including the control of the bit count generated by the printer.

Fig. 26 is a block diagram showing the manner in which Figs. 25*a* through 25*h* are arranged.

Figure 28:
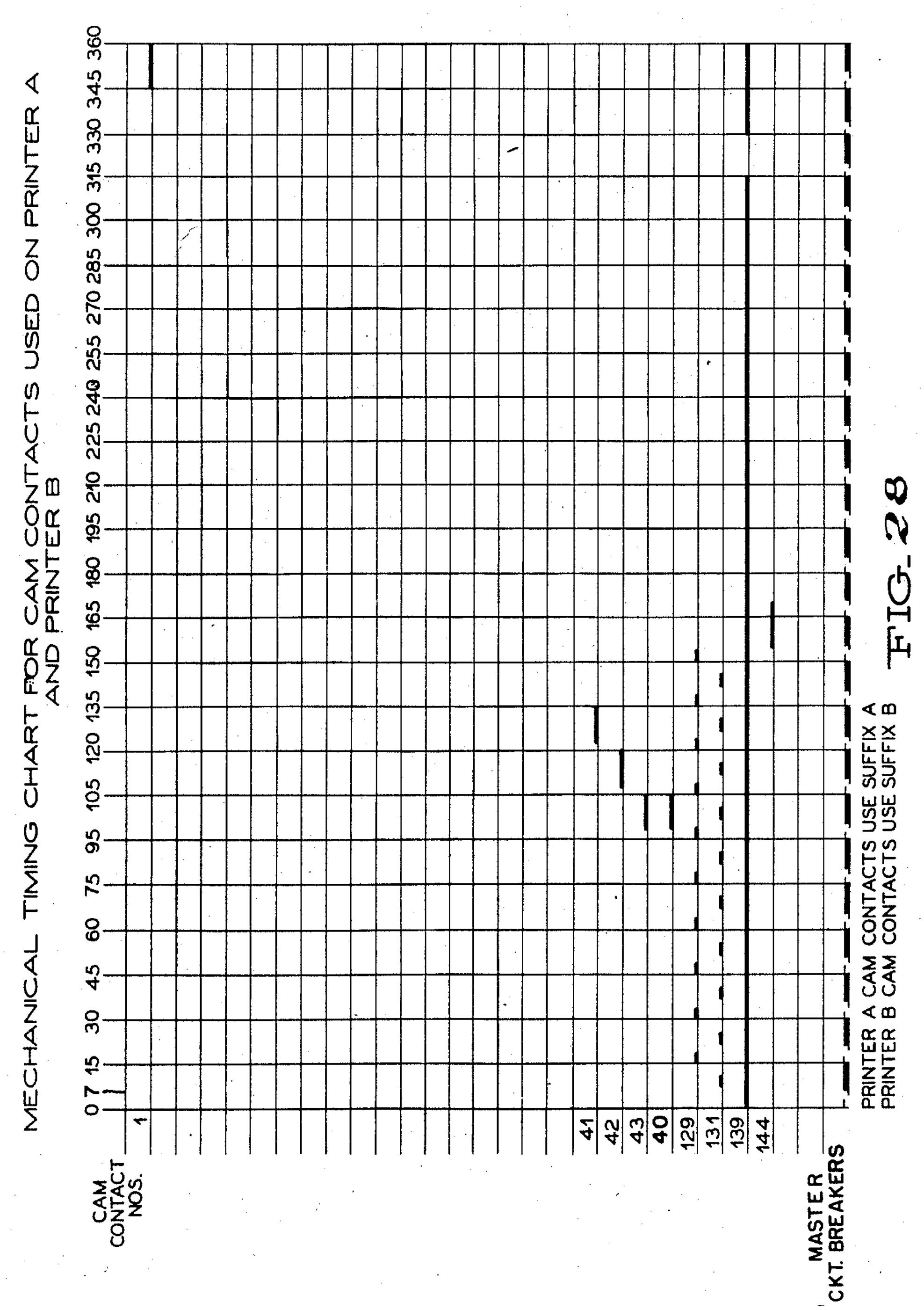

Fig. 27 is a schematic view of the line printer incorporating the improved control; and, Fig. 28 is a timing chart for the cam operated contacts or circuit breakers used for the printing operations.

*General description*

A pair of printers, hereinafter referred to as printer A and printer B, are designed to print data received from a storage device in a calculator or the like (not shown) and to generate a bit count from the data printed and compare it with the bit count transmitted from the storage device.

The printers are mechanically alike and comprise two separate electromechanical print units, each with its own print control and carriage circuits. The electronic circuits for the control of the printing circuits and the bit count circuitry is common to both machines. This arrangement is possible because simultaneous printing is not a requirement of the printers.

Figure 1:
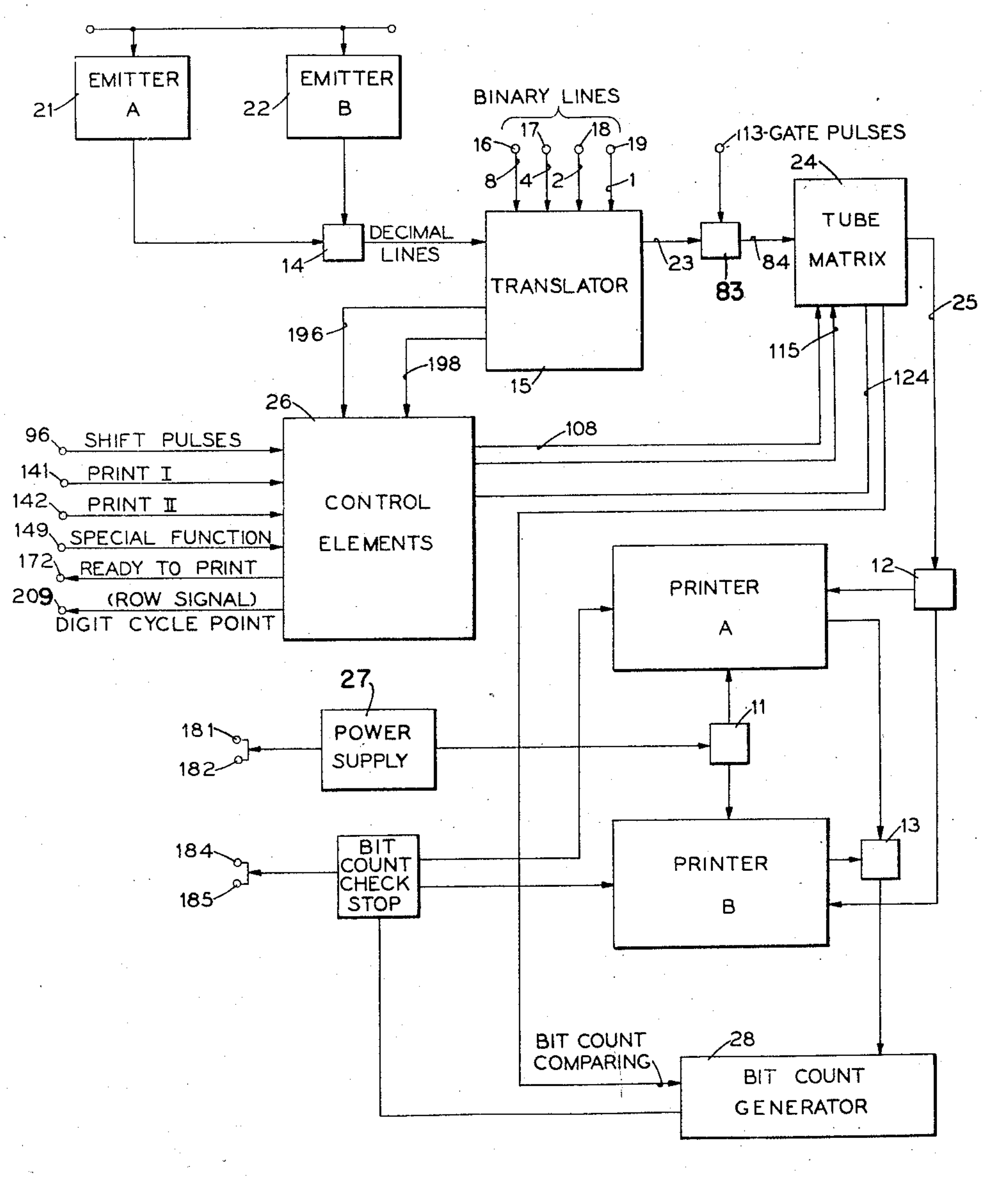
Fig. 1 shows an over-all block diagram of the line printers and the improved control means therefor.

Referring now to the drawings, there is shown in Fig. 1 a schematic block diagram of the general arrangement and interconnections of the various units comprising the improved printer control. The direction of flow of numeric information or data and various control signals between the units is indicated by arrowheads on the interconnecting conductors. Since Fig. 1 comprises a simplified representation of the improved printer control, it will be appreciated that a single conductor may represent a multiple number of conductors and allied circuitry.

As shown, there is represented the pair of printer mechanisms or units A and B, respectively, which, in this instance, are line printers of the type capable of printing an entire line at each machine cycle, interconnected by switch means 11, 12, 13 and 14 which are selectively actuated to channel information or signals to and conduct signals from the selected printing unit A or B.

In order to direct the proper signal or data to the printer, there is provided a combinational code translator capable of translating from one code to another. In this embodiment a binary to decimal translator unit 15 of the serial type is provided which receives a full line of information in the form of electrical pulses over binary 8–4–2–1 input lines 16, 17, 18 and 19, respectively. These lines are connected to a suitable storage device which may form a part of a calculator (both of which are not shown).

The translation of this binary information or data into decimal form is under the control of print A or print B emitters 21 or 22, respectively, which are selectively connected to the translator by the switch means 14. The emitters are mechanically connected (not shown) to their respective printers A or B and moved in synchronism with the cycle points in the printer cycle. These emitters, when operated, function to selectively cooperate with the translator to translate the proper binary pulses to a corresponding decimal value and permit the flow of all information or data serially in the nature of electrical pulses along a single line 23 to a suitable matrix 24. This matrix, as will be hereinafter fully described, includes a pair of rings and a group of gas tubes arranged in rows and columns. Each row represents a group of ordered positions defined as a word with each word forming a part of a line of typed numeric information and each column represents an ordered position in each word. The sum of the rows or words represents an entire line of typed information. Whenever coincidence of pulses occurs between a particular row and column and the translator, the gas tube at this point is fired which in turn operates mechanism in the selected printer A or B through line 25 to set up the printing of the numeric value selected.

The emitters 21 and 22 are so arranged as to move consecutively from a 9 machine digit cycle point through a 0 cycle point in accordance with the printer operating characteristics. At each cycle point the entire group of words forming the line are serially transmitted to the translator 15 from the storage device. However, only the decimal value of the binary code corresponding to the cycle point position of the emitter is transmitted to the matrix 24. As the emitter reaches each different cycle point and is ready to again receive the same information, a row or digit cycle point signal is transmitted to the storage device or calculator advising that the printer is now ready to receive the same information; however, at this time the numeric value to be separated and translated is of the next lower digital value.

Various pulses both received and delivered from a group of control elements or means 26 are provided to properly time the operation of the printer and delivery of data in a manner to be hereinafter described. A suitable source of power 27 is provided to operate the printer and other necessary apparatus.

In order to insure a checking means between the numeric information received by the translator 15 and that printed, a printer bit count generator and comparing device 28 is provided. This device is so arranged as to respond to the printing mechanism and operates on a suitable modulus corresponding to the bit count transmitted with each word over the binary code 1 and 2 lines 19 and 18, respectively. If the bit count generated for each word is correct, it will compare with the bit count transmitted by the storage device and this correct bit count permits operation of the printer and the delivery of the next line of numeric data to the printer. However, if the bit counts do not compare, which represents an error of some type, the printer is stopped and a signal is transmitted to the storage device or source of information that such a condition exists and interrupts the flow of further information to the selected printer until the error has been checked and corrected. The detailed description of this mechanism is shown and described in the above O. B. Shafer et al. application Serial Number 469,592.

*Tubes and control switches*

In each of the drawings of the various control devices, the individual components or units making up that device are indicated merely as a box or block. The detailed circuitry of each such block will be presently described as applied to various typical forms of tubes and diode circuits which are shown diagrammatically in Figs. 6*a* to 24*b*.

Figure 6A:
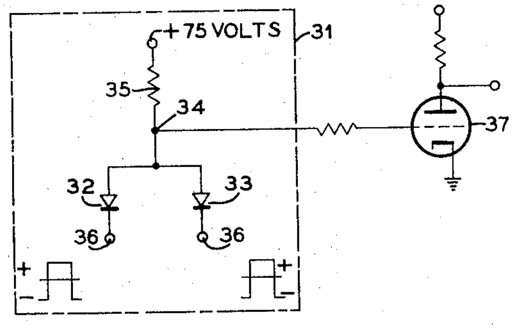
Figure 6B:
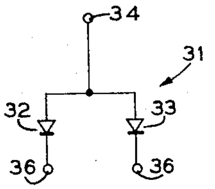

In Fig. 6*a*, for example, there is shown a typical coincidence switch, otherwise known as a logical "and" circuit or diode switch 31 comprising a pair of germanium crystal diodes 32 and 33. A common terminal 34 of the diodes 32 and 33 is connected through a voltage-dropping resistance 35 to a positive 75 volt source (not shown). The diodes 32 and 33 each include an individual input terminal 36, both of which are normally biased negatively so that the common terminal 34 is normally at a negative potential with respect to ground. If coincident positive pulses are applied to both input terminals 36, the potential of the terminal 34 is raised. However, if only one of the input terminals is pulsed positively, the potential of the common terminal 34 is not raised appreciably. A voltage responsive device, such as a suitable electron tube amplifier 37, is controlled by the potential of the terminal 34 to furnish a usable output voltage pulse whenever a coincidence of positive input pulses is detected. For simplicity in the drawings, the portion of the coincidence switch shown in the broken line rectangle 31 in Fig. 6*a* is generally represented as shown in Fig. 6*b*. This representation omits the dropping resistor 35 and the connection to the positive voltage source. While in the diagram only two germanium crystal diodes and input terminals 36 are shown, it is to be understood there are frequently more than two diodes incorporated in the diode switch. With any suitable number, the switch operation is identical when positive coincidence occurs at each input terminal.

Figure 7A:
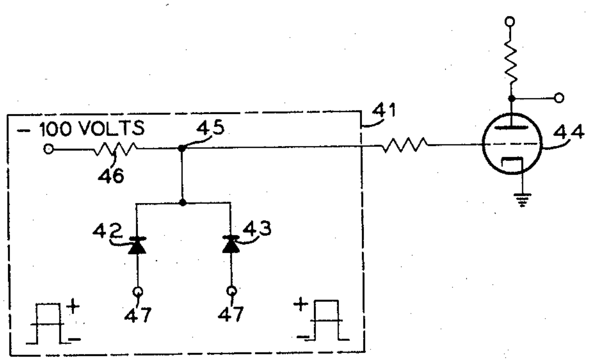
Figure 7B:
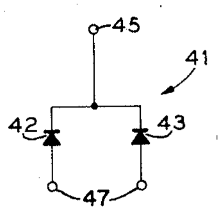

In Fig. 7*a* there is shown a typical mixer, otherwise known as a logical "or" circuit or diode mix 41, comprising a pair of germanium crystal diodes 42 and 43. The diodes which are employed in mixers are shaded and the direction reversed in the present drawings to distinguish them from the diodes which are employed in the switches. A voltage responsive device, represented by an electron tube amplifier 44, is controlled by the potential of a common output terminal 45 of the diodes 42 and 43, which terminal is connected by a suitable resistor 46 to a negative 100 volt source (not shown) to normally maintain a negative bias in the grid of the tube 44. Each diode is connected to an individual terminal 47 which in turn are connected in the electrical circuit. If either one (or both) of the diode input terminals 47 is pulsed positively, the potential of the terminal 45 is raised which permits the tube associated therewith to conduct. For convenience, the portion of the diode mix or "or" circuit shown in the broken line rectangle 41 in Fig. 7*a* is generally represented in the drawings as shown in Fig. 7*b*. This representation omits the resistor 46 and the connection to the negative voltage source. As in the diode switch diagram, it is to be understood the diagram representation of the diode mix 41 may involve more than the two diodes and input terminals 47 and that each additional input terminal 47 will be provided with an additional diode, such as the diodes 42 and 43 of Fig. 7*a* and that the cathode of each of these additional diodes will be connected to the common terminal 45.

Figure 8A:
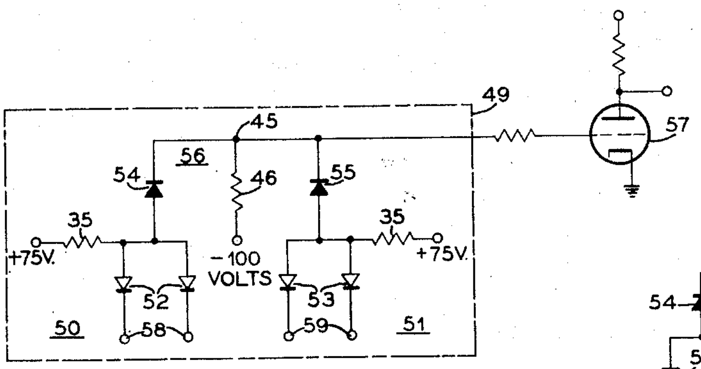
Figure 8B:
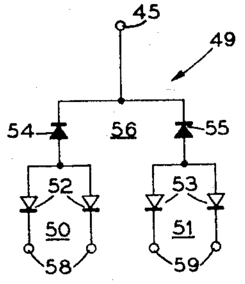

In Fig. 8*a* there is shown a typical circuit arrangement 49 wherein a pair of separate diode switches 50 and 51, respectively, each comprising a pair of germanium crystal diode switches or "and" circuits 52 and 53, respectively, feed through their respective diode mixer diodes 54 and 55 forming part of a diode mix circuit 56 to the voltage responsive device represented by the electronic amplifier 57. A coincidence of positive voltage pulses at input terminals 58, or at input terminals 59 causes the grid voltage of the tube 57 to rise to permit the tube to conduct. Fig. 8*b* illustrates the simplified showing of the diode network as used in the drawings. As in the previous diode arrangements, any number of diodes in both the diode switches or diode mixes may be incorporated in the switching circuit.

Figure 12A:
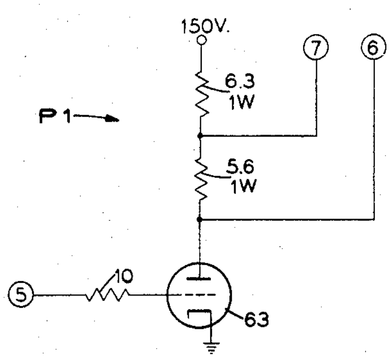
Figure 13A:
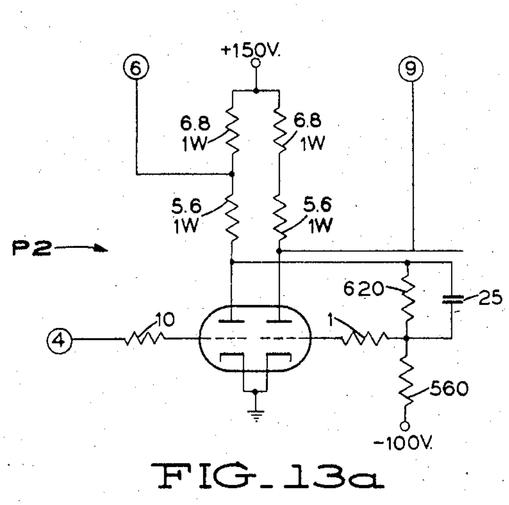
Figure 14A:
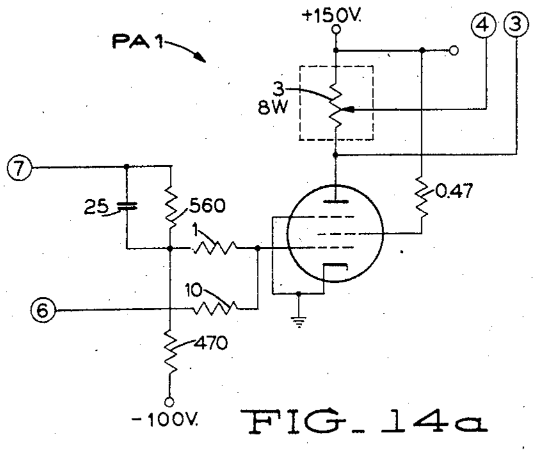
Figure 14B:
Figure 15A:
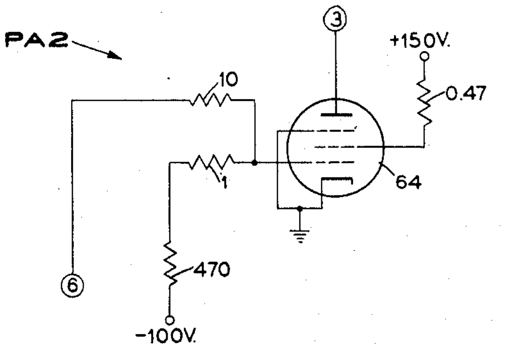

Referring momentarily to Figs. 25*a* to 25*j*, inclusive, which represents the diagram of the control circuit, each of the component blocks or units, comprising a particular tube circuit, is labeled with a letter in combination with a number. By referring to Figs. 9*a* to 24*a*, inclusive, the respective detailed circuitry of any component block may be determined by identifying the letter-number block designation. Each of the particular letter combinations, in the component block, in addition to acting as a reference designation, also denotes the function of the component. Thus, all the units shown in Figs. 9*a* through 11*a*, for example, are cathode followers, and are accordingly labeled with the prefix letters CF; the units shown in Figs. 12*a* and 13*a* are power units or inverters and are accordingly labeled with the prefix letter P; the units shown in Figs. 14*a* and 15*a* are power amplifier units and are accordingly labeled with the prefix letters PA; all the units shown in Figs. 16*a* through **19*a*** are trigger units and are accordingly labeled with the prefix letter T; all the units shown in Figs. 20*a* through 23*a* are heated cathode type gas tube units or thyratrons and are accordingly labeled with the prefix letters GT; and the unit shown in Fig. 24*a* is an inverter follower unit and is accordingly labeled with the prefix letters IF.

Before proceeding with a description of the various control circuits or devices of the printer, a brief description of representative ones of the detailed circuit units or components, Figs. 9*a* through 24*a*, utilized in these control circuits will be given. In each of the unit diagrams and other circuit diagrams, the values of the various resistors utilized therein are labeled in thousands (K) of ohms, while the values of the various capacitors are indicated in micro-microfarads. Hereinafter, in this specification wherein a conductor or a circuit terminal or the like is referred to as being shifted positive or negative in potential, this does not necessarily mean that the point, in question, is positive or negative in an absolute sense, but only more positive or more negative, relative to its previous state. This principle also applies to any description wherein positive and negative pulses are mentioned.

Figure 10A:
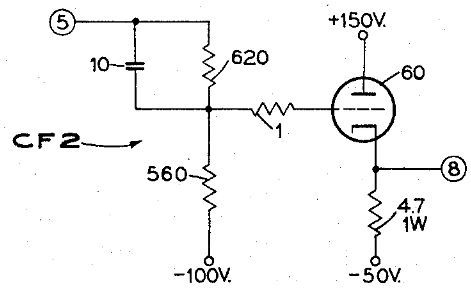
Figure 10B:

Referring now to Figs. 10*a* and 10*b*, the unit CF2 comprises a triode vacuum tube 60. In actual practice this may be of a dual triode—Type 5965. The grid of the triode is connected through a 1K and a series 560K ohm resistor to a negative 100 volt supply. The cathode of each triode is respectively connected through a 4.7K ohm 1 watt resistor to a negative 50 volt supply and the anode or plate of the triode section is connected to a positive 150 volt supply. The 1K resistor of the triode is also connected, via a 620K resistor, in parallel with a 10 micro-microfarad condenser, to an input terminal 5. The output of the triode is taken from terminal 8 connected to the cathode side of the 4.7K resistor. The input terminal 5 is connected to a switching potential, which is either at a potential of positive 150 volts or positive 50 volts. With positive 150 volts on terminal 5, the associated grid is maintained at such a potential that the tube current is at a maximum and accordingly the cathode terminal 8 is at a maximum positive potential of plus 25 volts. With a positive 50 volts on terminal 5, the associated grid is maintained at such a potential that the tube current is at a minimum and accordingly the cathode terminal 8 is at a minimum negative potential of approximately 18 volts. Thus, a shift of potential on the terminal 5 effects a corresponding in-phase shift of potential of the output terminal 8. This well-known type of tube action is referred to as cathode follower action.

It will be noted that the cathode resistor of the triode is of relatively low value. As a result, the cathode output terminal serves as a low impedance signal source. A low impedance signal source may be "loaded" appreciably without substantially affecting the magnitude of the signals supplied therefrom. This is the main purpose of a cathode follower unit. The capacitor, shunting the 620 input resistor, is to rapidly apply the voltage shift of the input terminal 5 to the grid, so that the resultant shift in potential, of cathode terminal 8 does not appreciably lag the input voltage.

Figure 9A:
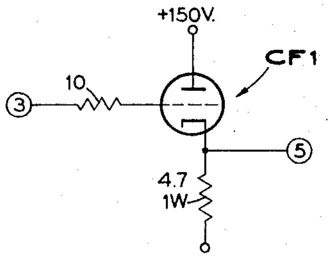
Figure 9B:
Figure 11A:
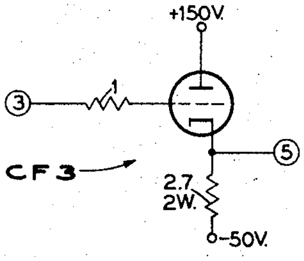
Figure 11B:

The cathode follower units CF1 and CF3, shown in Figs. 9*a*, 9*b* and 11*a*, 11*b*, respectively, function in essentially the same manner as cathode follower unit CF2, although they do not include the 100 volt negative bias on the grid and the magnitude of the switching voltages may differ. The differences in resistor values is to provide proper power for different requirements. In the drawings the blocks shown in Figs. 9*b*, 10*b* and 11*b* are shown for simplification of the wiring diagram and represent the tubes, **9*a*, 10*a* and 11*a***, respectively.

Figure 12B:
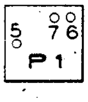

Referring now to Figs. 12*a* and 12*b*, an inverter or amplifier unit P1 comprises a triode 63, Type 5965, having its cathode connected to ground. An inverter, as its name implies, is adapted to simply invert a signal. Thus, if the grid terminal 5 shifts positive, the triode conducts more heavily and the associated plate output terminals 6 and tap 7 shift negative. Similarly, if the grid terminal 5 shifts negative, the terminals 6 and 7 shift positive.

Figure 13B:
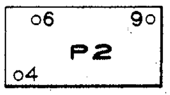

In Figs. 13*a* and 13*b* an amplifier or double inverter P2 is provided. In this instance a dual triode, Type 5965, is arranged so that the grid on the left-hand triode is connected to a variable voltage source at the terminal 4 and the grid on the right-hand triode is biased positive by the left-hand plate voltage. Thus with the right side conducting the plate voltage at the No. 9 terminal is low while the voltage at the terminal 6 connected to the left-hand plate is high. When a positive potential is received at the left-hand grid over the terminal 4 that side of the tube conducts, which by dropping its plate voltage cuts off the right-hand side of the tube. Upon cutoff, the voltage at the terminal 9 rises while the voltage at the terminal 6 on the conducting side of the dual triode drops. Thus, it can be seen that the terminal 9 on the right-hand triode directly follows the potential of the left-hand grid voltage, while the voltage at the terminal 6 is inverted.

Power amplifiers or units effect 180° signal inversion of an applied signal so that they may also be classified as inverters. However, they differ from the inverter units, which are primarily voltage devices, in that they can supply considerable power to the circuits to which they are connected. In Figs. 14*a* and 14*b*, a unit PA1 comprises a pentode tube, Type 6AQ5, wherein the application of a positive signal to the grid input terminals 6 or 7 through the related resistors results in an inverted output signal on the plate terminal 3 and the variable tap 4.

Figure 15B:

Figs. 15*a* and 15*b* represent a PA2 power amplifier unit comprising a pentode, Type 6AQ5, which is similar to power amplifier PA1, with the exception that plate terminal 3 is connected to a different source of positive potential than the positive 150 volt source applied to the screen 64 at the terminal 5. In all other respects the amplifier functions in the same manner when a positive pulse is applied to the grid through its terminal 6.

Figure 16A:
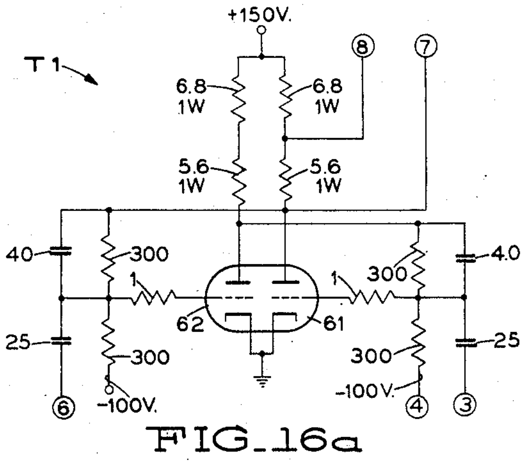
Figure 16B:
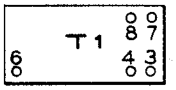

Referring now to Figs. 16*a* and 16*b*, a trigger unit T1 is shown which is conventional in construction and comprises two retroactively coupled triode sections 61 and 62, respectively, of a Type 5965 vacuum tube. By proper selection of circuit components, the unit T1 is so arranged that only one of the triode sections is conductive, at a time, in accordance with well-known trigger operation. With the right-hand triode 61 conducting, the trigger is defined as being in an Off position. With the trigger Off, the plate terminal 8 and tap terminal 7 of the right-hand triode 61 are at some potential below the supply positive potential of 150 volts due to the current being drawn through the right-hand triode. As a result, voltage sensitive circuits which may be connected to terminals 8 and 7 are accordingly controlled. With the trigger Off, as assumed, the plate of the nonconducting left-hand triode 62 is at the positive supply potential of 150 volts.

If a negative going waveform or pulse is applied to input terminal 3, the grid of the right-hand triode 61 starts to shift negative. As a result, this triode is rendered less conductive. The resultant positive shifting of its plate is applied, through a 40 micro-microfarad condenser, to the grid of the left-hand triode 62 and renders this triode conductive. The resultant negative shifting of the plate of the left-hand triode is then applied, through its associated 40 micro-microfarad condenser, to the grid of the right-hand triode 61 and renders it less conductive. With the right-hand triode less conductive, the left-hand triode is rendered more conductive. This retroactive action between the left and right-hand triodes continues until the left-hand triode 62 is fully conductive and the right-hand triode 61 is nonconductive. This retroactive action is very rapid, so that in effect, the application of the negative shift to terminal 3 almost instantaneously initiates the "flipping" of conduction from the right to the left-hand triode. With the left-hand triode 62 conducting, the trigger is defined as being in an On condition. With the trigger On, the plate of the left-hand triode 62 is at a low potential, while the plate terminals 8 and 7 of the right-hand triode are at a positive 150 volts. With the shift of potential of terminal 8 and 7, associated circuits are accordingly controlled.

The trigger T1 is flipped from its On to its Off position by applying a negative voltage shift to grid input terminal 6 of the left-hand triode. The trigger unit is insensitive to positive voltage shifts applied to the terminals 6 and 3. Thus, if the trigger is On, it can not be shifted Off by positively pulsing the grid of the right-hand or nonconductive triode 61, but only by negatively pulsing the grid of the left-hand or conductive triode 62. This selective response to only negative pulses is effected by proper choice of bias potential.

Figure 17A:
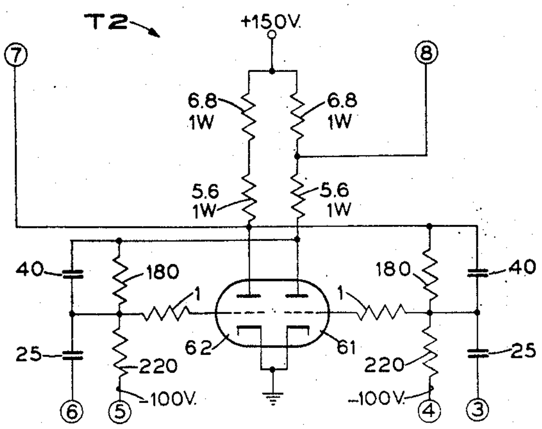
Figure 17B:
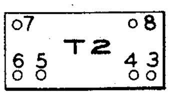

The trigger unit T2, as shown in Figs. 17*a* and 17*b*, functions in essentially the same manner as trigger unit T1, except terminal 7 is connected and responds to the plate of the left-hand triode 62 rather than to the plate of the right-hand triode 61.

Figure 18A:
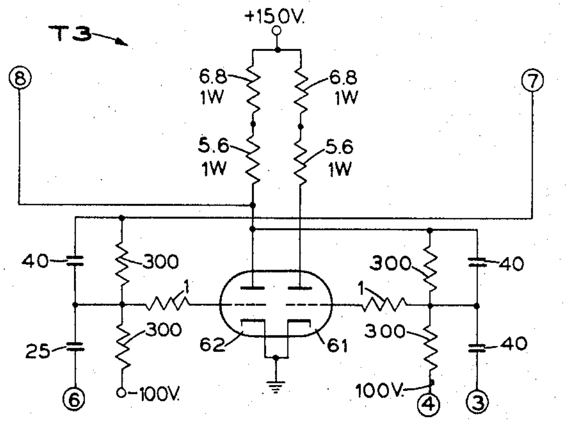
Figure 18B:
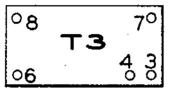

The trigger unit T3, shown in Figs. 18*a* and 18*b* is generally similar to the other trigger units, except that the terminal 8 has been shifted to respond to the plate voltage of the left-hand triode 62, while the terminal 7 responds to the plate voltage of the right-hand triode 61.

Figures 19A, 19B:
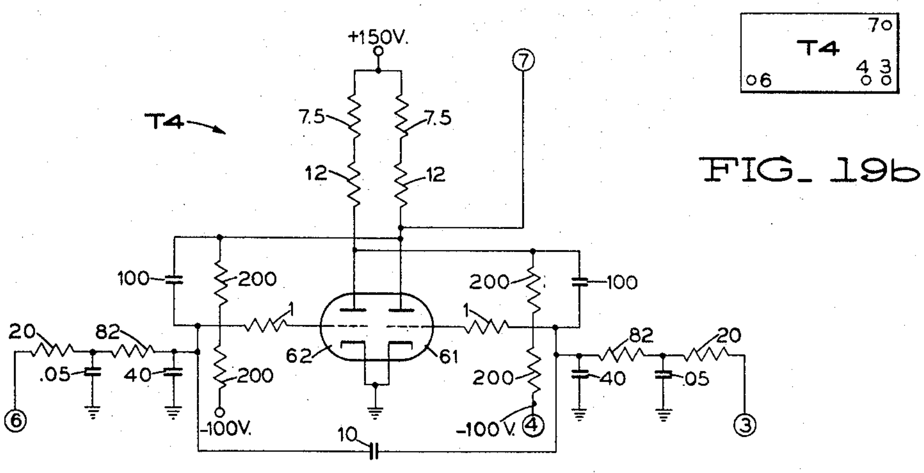

The trigger T4, shown in Figs. 19*a* and 19*b*, is of Type 5844, however, its operation is similar to the previously discussed triggers. This trigger is designed for control by cam contacts in the printer and is desensitized inasmuch as it is always operated with independent inputs. Triggering is accomplished by applying a positive 40 volts to the trigger grids through 20K and 82K coupling resistors. A .05 mfd. bypass capacitor is placed at each of the inputs of this trigger between the 20K and 82K resistors. With the external bypass capacitor between pins 3 and 6 and ground, this trigger will not recognize a pulse of less than approximately two milliseconds duration. However, once the triggering action starts, triggering is very rapid. The time constant of the resistor-condenser combination consisting of a 20K resistor and .05 mfd. capacitor determines the minimum pulse duration which will be recognized by the trigger. The reason for this bypass is to prevent operation of the triggers by transient voltages. Also, a 10 mmfd. capacitor connected across the grids between the 82K and 1K resistors eliminates any tendency for trigger operation by transient conditions which may develop in the system.

In order to provide a reset for all triggers, the 4 terminal, with one exception to be described later, is momentarily connected to a positive potential.

Hereinafter in this specification wherein a trigger is mentioned, the trigger is defined as being Off if the right side triode 61 is conductive, or On if the left side triode 62 is conductive.

Figure 20A:
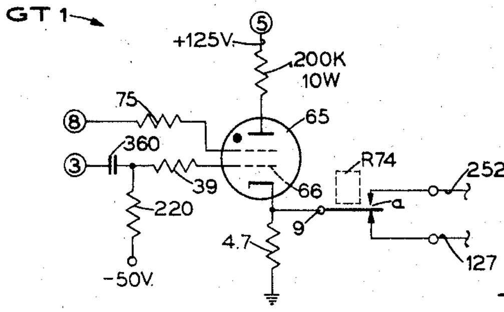
Figure 20B:
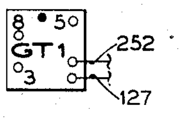
Figure 21A:
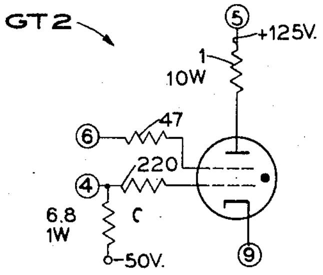
Figure 21B:
Figure 22A:
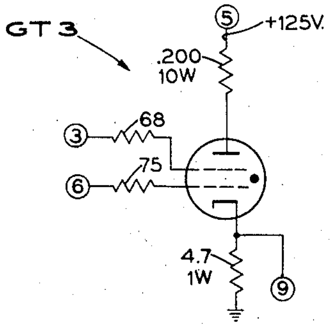
Figure 22B:
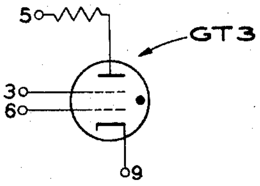
Figure 23A:
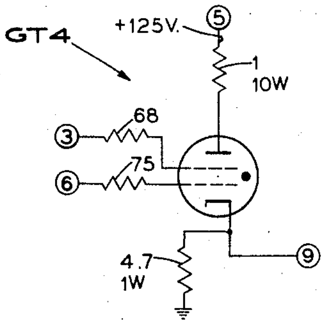
Figure 23B:

Referring now to Figs. 20*a* and 20*b*, a heated cathode type tube unit or thyratron GT1 comprises a Type 2D21 tetrode tube, the plate of which is connected in series with a .200K 10 watt dropping voltage resistor to a positive 125 volt supply. The cathode is connected in series with a 4.7K resistor to ground and the output terminal 9 is connected between the cathode and resistor. This gas filled tube includes a pair of grids 65 and 66, respectively. The grid 65 is connected in series with a 75K resistor to the terminal 8 and the grid 66 is in series with a 39K and a 360 mmfd. capacitor to the terminal 3. This latter grid is further biased to negative 50 volt supply through a 220K resistor which is connected between the capacitor and grid resistor. Thus, under normal operating conditions the grid 66 is biased negative and the tube is cut off or nonconducting. If both grids are biased positive, the tube fires and conducts through the terminal 9 for reasons to be hereinafter explained, and continues to conduct in the standard manner until such time as the positive 125 volt supply is interrupted. For simplicity in the main wiring diagram, each GT1 block also includes a normally closed and a normally open contact and a relay operated transfer operating point therefor which is utilized for printer A or printer B operation for reasons to be later described.

Heated cathode gas tube units GT2, GT3 and GT4 shown in Figs. 21*a*, 21*b*, 22*a*, 22*b*, 23*a* and 23*b* are the same type of tubes, however, the resistor values have been changed to meet operating conditions and the capacitor in the grid circuit has been eliminated.

Figs. 24*a* and 24*b* disclose an inverter follower IF and comprises a dual triode tube Type 5965. In this instance, the right-hand side 67 of the triode normally conducts which maintains a positive output or potential at the terminal 8. This conduction is assured by the potential applied to the grid from the left-hand side 68 of the plate circuit through the divider. The left-hand side 68 of the triode is normally nonconducting, however, when the left-hand grid is biased positive this side of the tube conducts and in so doing drops the grid potential on the right-hand side 67 to cut off conduction at this point. Upon cutoff, the 8 terminal following the negative 50 volt potential at the cathode will be reduced in value. Thus, with a positive pulse applied to the left-hand grid, a corresponding negative pulse is transmitted from the terminal 8.

In the foregoing description of the tubes, it is to be understood the resistors and capacitors may be varied within limits or even different type tube circuits employed. These figures are presented as a means for accomplishing the desired result.

*Binary to decimal translator*

Figure 2:
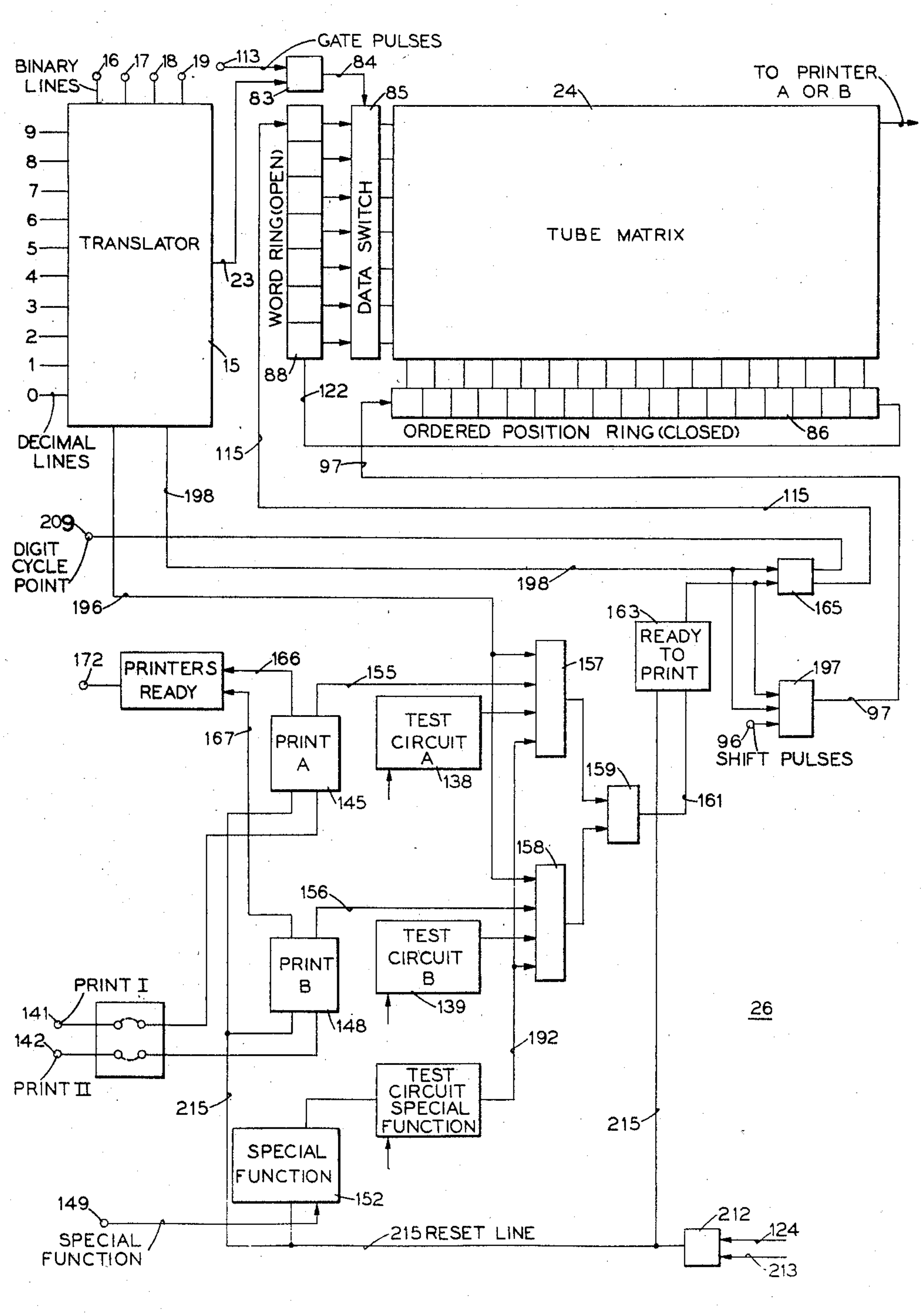
Fig. 2 is a block diagram of the control section for the printers in more detail.
Figure 25A:
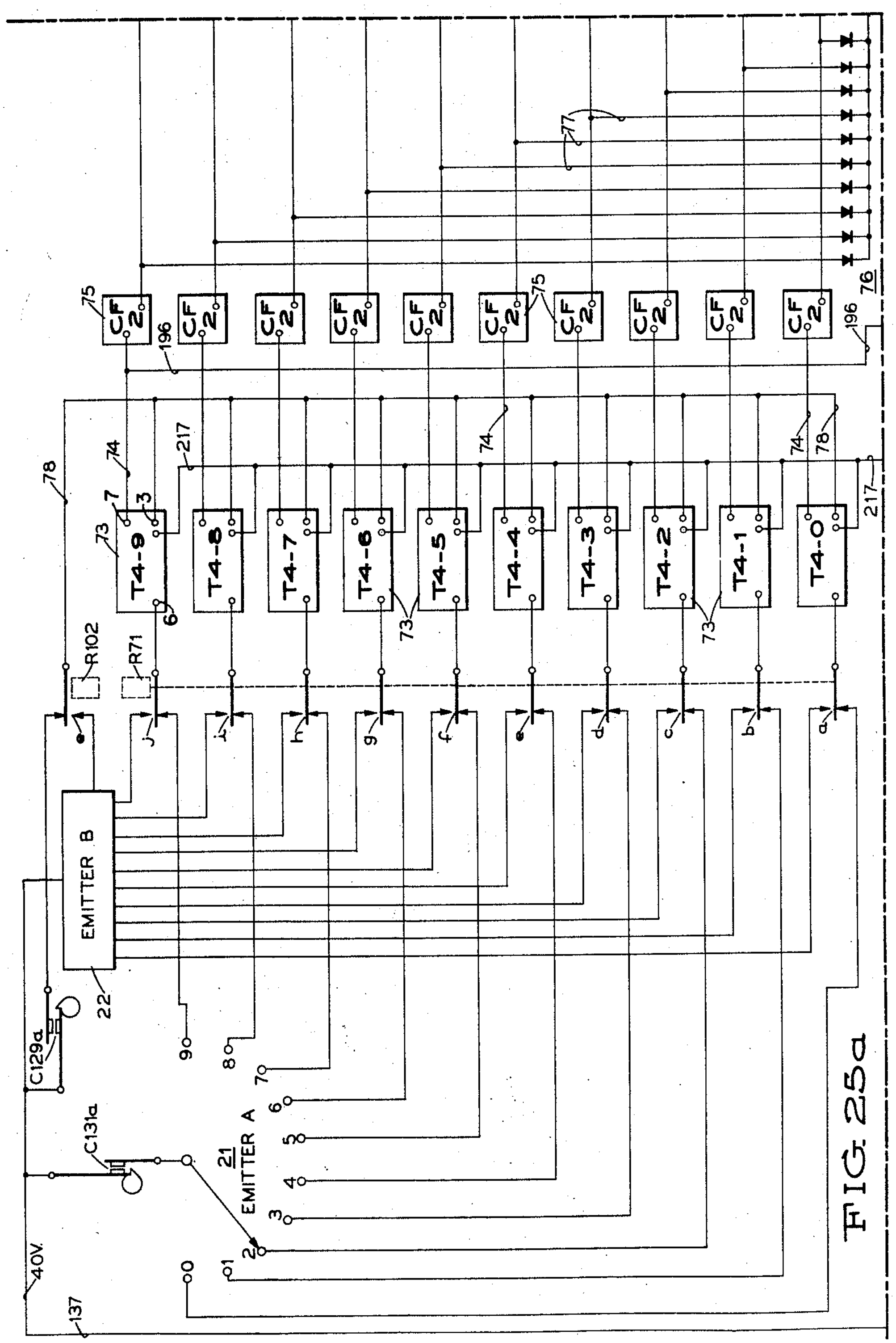
Figure 25B:
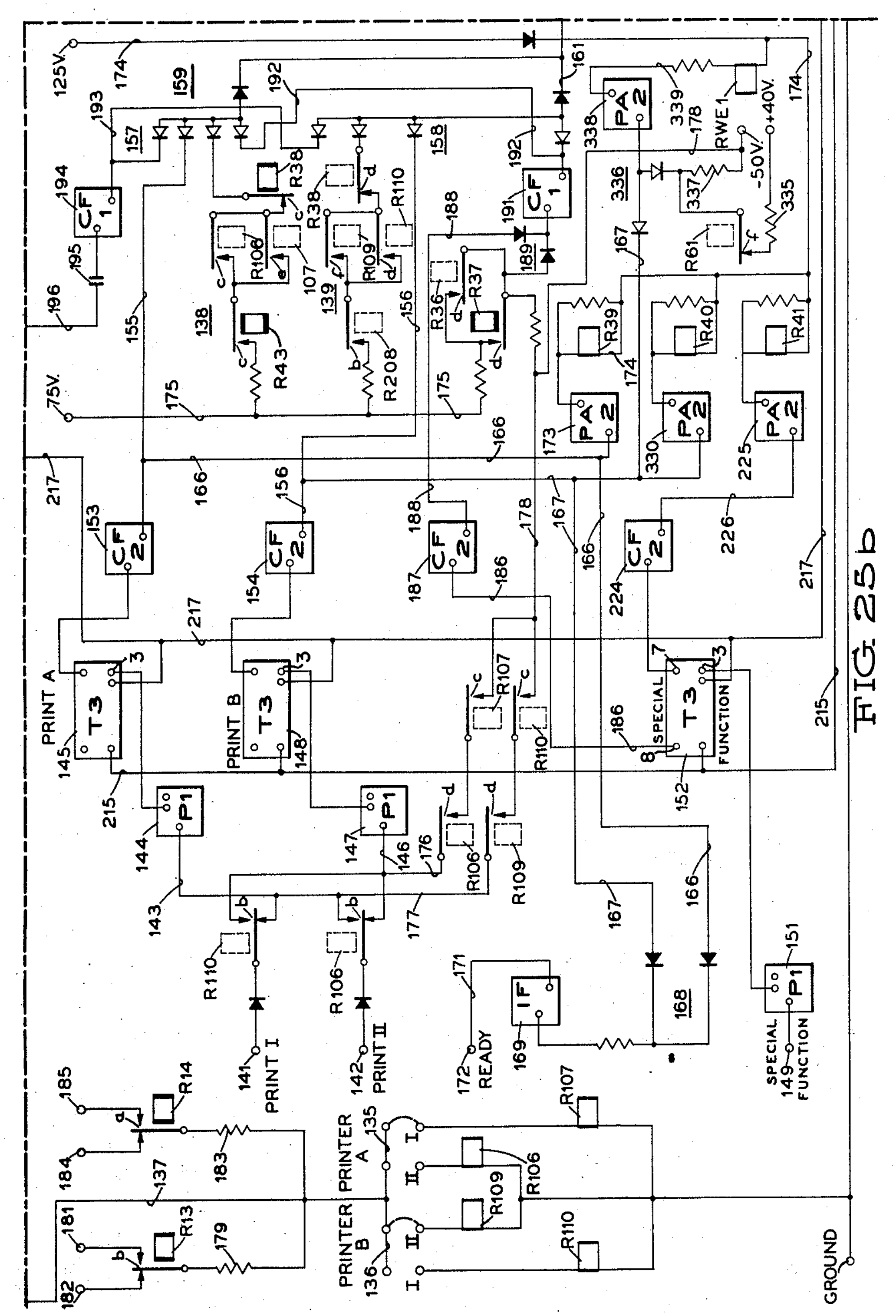
Figure 25C:
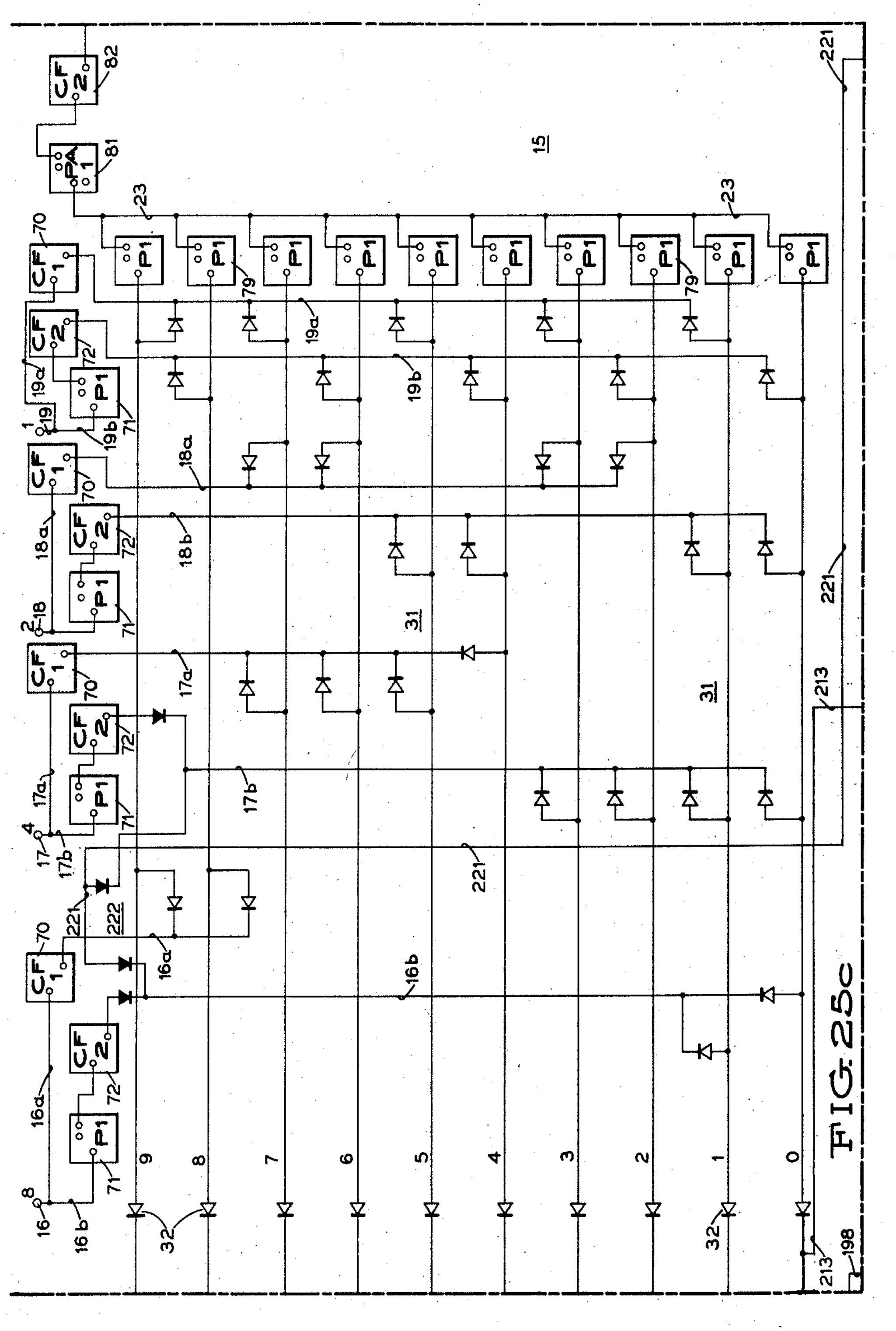

Referring now to Figs. 2, 25*a* and 25*c*, there is shown a data receiving and processing arrangement or circuitry for serially receiving a group of words in binary 1–2–4–8 code. Each word comprises a plurality of ordered positions, 16 in the embodiment disclosed, each having numeric values 9 through 0, and a group of seven words when combined form a line of numeric data or information to be printed, Figs. 3*a* and 3*b*. The complete line of data of seven words is serially transmitted from a suitable storage source in a calculator or the like (not shown) to the binary to decimal translator 15 over the binary code 8–4–2–1 lines 16, 17, 18 and 19, respectively. Each of the binary lines includes a CF1 cathode follower 70, Fig. 25*c*, whose output, along lines 16*a*, 17*a*, 18*a* and 19*a*, respectively, provides an increase in positive potential whenever the associated binary line is rendered positive. Any positive output from the cathode followers is impressed on a plurality of parallel decimal value lines 9 through 0 through appropriate germanium crystal diodes forming a part of diode switches or "and" circuits 31. The decimal 9 through 0 lines represent the numeric or digit value of each order. As shown, the output side of the cathode follower CF1 in binary line 16*a* is connected to the 9 and 8 decimal lines; the output of CF1 in the binary line 17*a* is connected to the 7, 6, 5 and 4 decimal lines; the output of CF1 in the binary line 18*a* is connected to the 7, 6, 3 and 2 decimal lines; and the output of CF1 in the binary line 19*a* is connected to the decimal 9, 7, 5, 3 and 1 lines.

Connected in parallel with each cathode follower CF1 line is a second line 16*b*, 17*b*, 18*b* and 19*b*, respectively, connected to the decimal 9 through 0 lines in a suitable manner and each line includes a P1 amplifier tube 71 and a CF2 cathode follower 72 connected in series. The last-mentioned lines are rendered positive by the P1 tube whenever the associated binary line is negative and may, for the purpose of this description, be called the no 8, no 4, no 2, and no 1 lines, respectively. These lines are connected to the decimal 9 through 0 lines in the following manner. Line 16*b* is connected to the decimal 1 and 0 lines; line 17*b* is connected to the decimal 3, 2, 1 and 0 lines; line 18*b* is connected to the decimal 5, 4, 1 and 0 lines; and line 19*b* is connected to the 8, 6, 4, 2 and 0 decimal lines. These lines extending from the P1 power tubes provide a continuous positive potential to the diodes in their respective lines whenever the potential at their respective binary lines is negative.

In series with the 9 through 0 decimal lines are the pair of printer A and B emitters 21 and 22, respectively, Fig. 25*a*. These emitters are mechanically driven (not shown) by the printer in synchronism with the machine digit cycle points. The emitters are moved from the 9 through 0 digit cycle points once for every machine cycle of 360°, and in this embodiment this takes place from 0° to 150° of the machine cycle.

As the emitter 21, Fig. 25*a*, moves from 9 to 8 through 0 consecutively, a cam operated contact C131A timed with the machine index provides timed positive pulses to each line consecutively. The B printer emitter 22 represented by the box is identical in operation as the A emitter 21 and involves the same elements.

The decimal lines 9 through 0, extending from both emitters are selectively connected to the operating points *a* through *j* of a relay R71. Under normal conditions the 9 through 0 lines from the emitter 21 connect with the operating points of relay R71 at the normally closed contacts R71*a* to R71*j*, inclusive. Extending in series with each operating point of these switches is a normally Off T4 trigger 73, the output terminal 7 of each being connected by a conductor 74 to the grid of a related CF2 cathode follower 75 whose output in turn leads to a diode 32, Fig. 25*c*, forming a part of the diode switch unit 31 for each decimal line 9 through 0. Thus, it can be seen that with the emitter 21, Fig. 25*a*, located at any digit cycle point, when the circuit is completed by the cam contact C131A the related trigger T4 is turned On by the emitter pulse of 40 volts pulsing the left-hand grid at the 6 terminal and the opposite side of the trigger goes positive. This drives the related cathode follower 75 to apply a positive voltage to the related diode 32 in the switch and conditions that line for the reception and transmission of a binary line pulse when received from the external storage source. At the time any of the above cathode followers CF2 go positive, this positive pulse is also supplied to a diode mix or "or" circuit 76 through a plurality of lines 77 for reasons to be hereinafter explained.

As mentioned, when the emitter reaches the beginning of any cycle point, the appropriate trigger T4 is turned On. After the emitter moves from this cycle point and before it reaches the next digit cycle point, a second timed pulse supplied by a cam contact C129A is transmitted through the normally closed point *e* of a relay R102 via a conductor 78 to the 3 terminal of the On trigger to turn the same Off. Thus this line is no longer positive and no further data will be accepted. As the emitter moves to the next cycle point position the next trigger T4 is turned On and the same sequence of events occur. All operations from 9 through 0 occur consecutively.

The output or opposite side of the 9 through 0 decimal lines are each supplied with a P1 amplifier 79, Fig. 25*c*, the output of each being connected to the common line 23. This line carries a PA1 power amplifier 81 connected to the grid of a CF2 cathode follower 82 to provide a positive pulse at a diode switch 83, Fig. 25*e*, when positive pulses are applied to any of the amplifiers 79 in the decimal lines 9 through 0, for reasons to be hereinafter described.

From the foregoing, it can be seen only the decimal line the emitter is contacting is rendered partially positive, and it is thus the only line capable of transmitting or gating a pulse to the line 23 when the proper pulse or combination of pulses are delivered from the external source or storage device.

With the above arrangement, assuming the emitter is at the decimal 9 line, it requires simultaneous positive pulses over the 8 and 1 binary code lines, corresponding to a decimal 9 to cause the entire 9 line to go positive at its diode switch 31 and operate its respective amplifier 79 to provide a negative pulse at the line 23. Since the binary values are delivered in parallel for each digit but serially for successive digits over various combinations of the 4 binary lines, all pulses, except those arriving simultaneously on the binary 8 and 1 lines 16 and 19, respectively, do not pass beyond the translator. With the emitter at the next or 8 digit cycle position only those pulses arriving singly on the binary 8 line permit the decimal 8 line to rise in potential beyond its diode switch 31.

It is to be noted that in order to avoid the interception or reading of a binary 8 and 1, which is a decimal 9, as a decimal 8, the amplifier 71 in the absence of a positive pulse in the binary 1 line 19*b* maintains this line and thus a portion of the decimal 8 diode switch positive to permit the decimal 8 line to go positive whenever a single pulse is received on the binary 8 line. However, the amplifier 71 in the line 19*b* will drive the 8 line negative when a simultaneous binary 8 and 1 pulse is received. This rejects both pulses at the decimal 8 line. The decimal 8 line will stay down until the positive value drops on the binary 1 line 19, after which the absence of a binary 1 pulse automatically raises the potential at the diode in the decimal 8 line. The same procedure is followed for all of the other digit cycle points involving the use of more than one binary line for conducting information. Decimal lines 9 and 7 are the only two which are not provided with a negative blocking pulse.

At 0 digit cycle point time, the decimal 0 line is rendered positive in the absence of a binary 1, 2, 4 or 8 pulse by means of the four power amplifiers 71, thus a pulse representing a zero is applied to the line 23.

*Word chart*

Referring now to Figs. 3*a* and 3*b*, there is diagrammatically shown a complete line of numeric data which is stored in a storage device of a calculator or the like. In this instance, the line includes 119 ordered positions which are to be transmitted to one of the printing units A or B to print the identical numeric values, with the exceptions to be described later, in the identical ordered positions.

For convenience each line is shown divided into seven words, each having sixteen ordered positions plus an order position at the beginning of each word for the bit count of its respective word and includes a space between each word to provide seventeen numeric spaces plus a blank. This is more clearly shown at the top of Figs. 3*a* and 3*b* where each space of each word is numbered 1 through 17. It will be noted the first position or space of each word is labeled Bit Count, the next two are labeled Index and the fourth is labeled Sign, which will be described later. With the bit count spacing removed, this leaves a total of 16 different ordered positions for each word or a total of 112 positions.

The second row of information represents numeric values 0 through 9 for each position which are arbitrarily established to more clearly describe the invention. At the beginning of each word there is a pair of numbers enclosed in a box. Each lower number represents the actual bit count remainder for the numeric values of that word based on a 4 modulus. The bit count is based on the following binary code:

| Decimal digit | Binary equivalent | Number of bits |
|---|---|---|
| 0 | 0000 | 0 |
| 1 | 0001 | 1 |
| 2 | 0010 | 1 |
| 3 | 0011 | 2 |
| 4 | 0100 | 1 |
| 5 | 0101 | 2 |
| 6 | 0110 | 2 |
| 7 | 0111 | 3 |
| 8 | 1000 | 1 |
| 9 | 1001 | 2 |

Thus in the words 1 to 7 illustrated, the following total bit count would be involved:

| Word | Total Binary Bit Count | Binary Bit Count Remainder Modulo 4 | Bit Count Remainder Modulo 4 | Bit Count Complement |
|---|---|---|---|---|
| 1 | 25 | 0001 | 1 | 2 |
| 2 | 20 | 0000 | 0 | 3 |
| 3 | 26 | 0010 | 2 | 1 |
| 4 | 23 | 0011 | 3 | 0 |
| 5 | 25 | 0001 | 1 | 2 |
| 6 | 26 | 0010 | 2 | 1 |
| 7 | 25 | 0001 | 1 | 2 |

Taking the total bit count of the numeric values of each word and dividing on a 4 modulus dropping all values divisible by 4 and retaining the remainder, it can be seen that the remaining bit count in each of the words 1 through 7 is 1, 0, 2, 3, 1, 2, 1, respectively. Hereafter, when bit count is referred to, it is meant the remainder after the removal of all bit counts divisible by 4. However, in this particular example and for the use to which this improved printer is intended, it has been found desirable to transmit the 3's complement of the bit count from the storage device. Thus, the 3's complement of the above bit count is 2, 3, 1, 0, 2, 1, 2, respectively and these values are located directly above the actual bit count values. The bit count complements are the actual values transmitted for the bit count check to be later described, however, it is to be understood the actual bit count could be used, if desired.

While the numeric values of each word are actually stored in a suitable storage device in binary 1–2–4–8 code in any suitable manner and are serially delivered in the form of pulses along the binary 1–2–4–8 lines to the translator 15, the machine digit cycle point time of the printer determines the earliest the data can be delivered to the translator. At the proper machine signal, the entire group of words or entire line of numeric data leaves the storage source as a series of pulses or combination of pulses parallel by bit, serial by digit as shown below the numeric values. These pulses represent the binary value for the numeric value directly above.

Figure 25D:
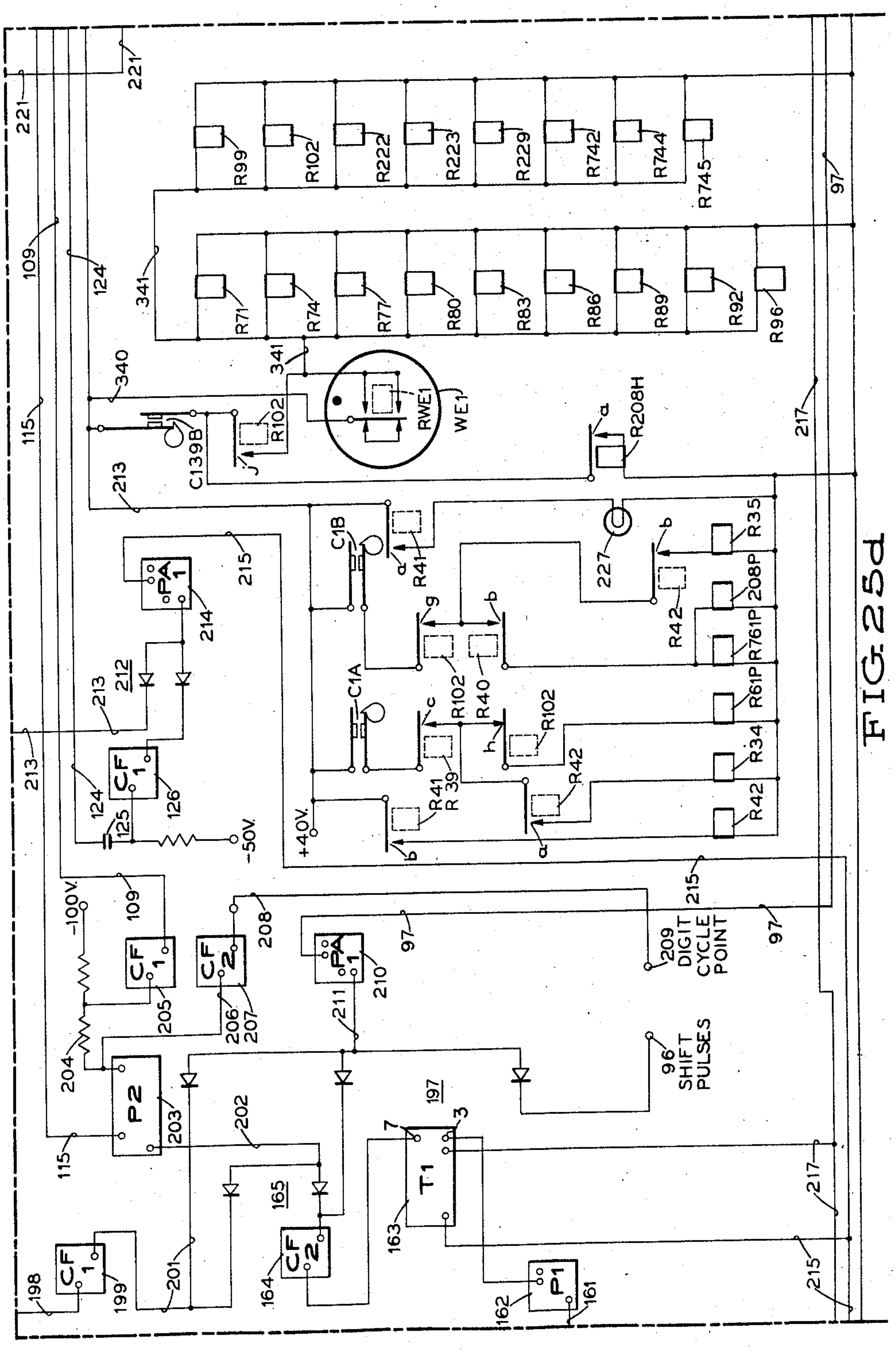
Figure 25E:
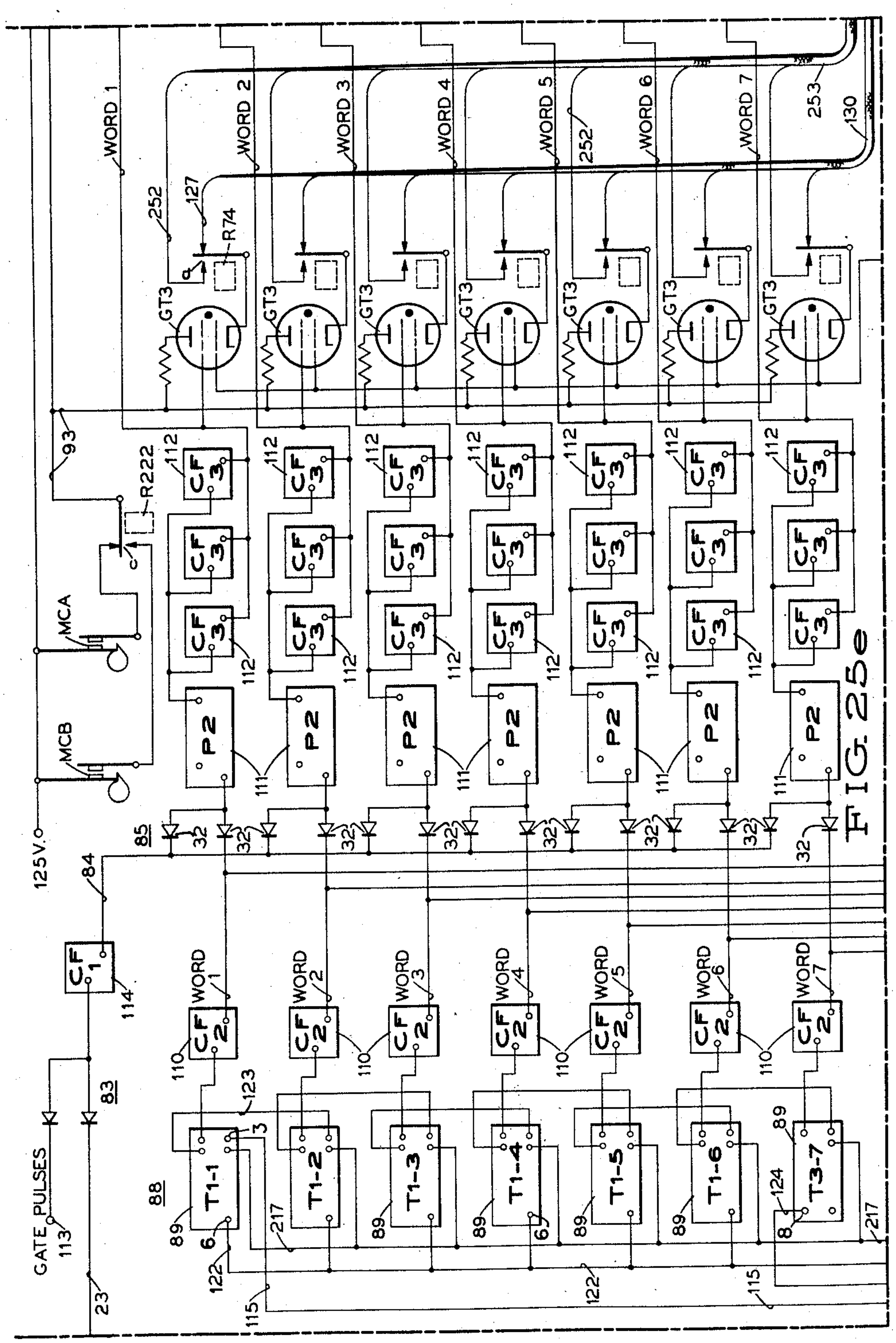

Assuming the printer is ready to receive the numeric data, the emitter 21, Fig. 25*a*, will be on the decimal 9 line and as all the pulses of the entire line of data pass to the translator, Fig. 25*c*, only those involving simultaneous pulses on the binary 8 and 1 lines, representing a decimal 9, raise the decimal 9 line to operate its related amplifier 79 to provide a negative pulse on the single line 23 and a resultant positive pulse at the diode switch 83, Fig. 25*e*. As shown in Figs. 3*a* and 3*b*, the binary 9's at 9 cycle point time are separated in the form of positive pulses in definite timed relation corresponding to the ordered position of the numeric value. Since these pulses are not uniformly spaced, the line 23, Fig. 25*c*, when responding to the 9 position, is correspondingly varied at identical time intervals. The output from the line 23 conditions the diode switch 83, Fig. 25*e*, in a predetermined manner to feed a series of positive pulses over a conductor 84 to a plurality of parallel diode word switches 85 in the matrix 24 to be described later.

At 8 digit cycle point time, the decimal 8 line is ready and a signal is transmitted to the storage device and the entire line of data or group of words is again delivered to the translator 15, however, in this instance only the binary 8 pulses are transmitted over the line 23. The same operation occurs at each machine digit cycle point to 0 with pulse blocking occuring where necessary, as previously described.

It can be seen that at 3, 2 and 1 digit cycle point time the bit count, if any, for each word is transmitted over the binary 2–1 lines and the line 23 along with the numeric data.

Thus, to read and process an entire line of numeric data, the entire line of data must be delivered to the translator ten times, once for each machine digit cycle point. Likewise, it is to be observed that using the numeric data given in the example, Figs. 3*a* and 3*b*, the line 23 is serially pulsed at each decimal cycle point in a manner which starts at the left-hand portion of the diagram and following to the right serially from the 9 through 0 digit cycle point positions.

Figs. 4*a* and 4*b* illustrate the time feature of a machine digit cycle point with respect to the time required to supply the entire line of numeric data from the storage device. The 9 machine cycle point is shown and this represents a time interval of 8.9 milliseconds of active time at the cycle point or a total of 16.6 milliseconds between machine cycle digit points. The time required to transmit the entire line of numeric data to the translator is 1.0008 milliseconds. Thus it can be seen that as far as sending data from the storage device precise timing is not necessary because the printer is capable of receiving information at any time during 8.9 millisecond interval. However, the pulse should be received early in the cycle point in order to allow time for an inductive use in the print magnets, not shown.

Also shown on this diagram are three groups of pulses which are 4 micro-seconds in duration. The second group represents shift pulses which are used to step the matrix 24 in a predetermined manner. These shift pulses are also divided into groups of seventeen pulses each group separated by a space and are equivalent to the pulses representing the numeric data as shown in Figs. 3*a* and 3*b*, one pulse for each ordered position in the line. Directly above the shift pulses is a line of gate pulses which are 180° out of phase. These gate pulses are supplied to the diode switch 83, Fig. 25*e*, continuously during the entire machine operation and permit the positive pulsing of the word switches 85 in the matrix 24 whenever the line 23 is pulsed by data leaving the translator 15, Fig. 25*c*. Below the shift pulses and in the ordered positions as shown in Figs. 3*a* and 3*b*, a single pulse is represented to show when the decimal 9 line is rendered positive by the binary 8–1 lines to pulse the output line 23.

The upper portion of Fig. 5 diagrammatically shows the machine cycle points 9 through 0 along with the time intervals between points and a relative representation of the time intervals between points and a relative representation of the time required to receive the numeric information from the storage source. From this diagram it can readily be seen that the numeric information is supplied serially to the translator once for each machine cycle point. After the data has been delivered at any digit cycle point, the calculator has approximately 15 milliseconds before the next cycle point, therefore, it is free to continue calculator operation during this interval, plus the entire time the printing operation is taking place The printer and calculator are interlocked so that calculations are discontinued during transfer of data or values to the printer.

*Matrix*

Figure 25F:
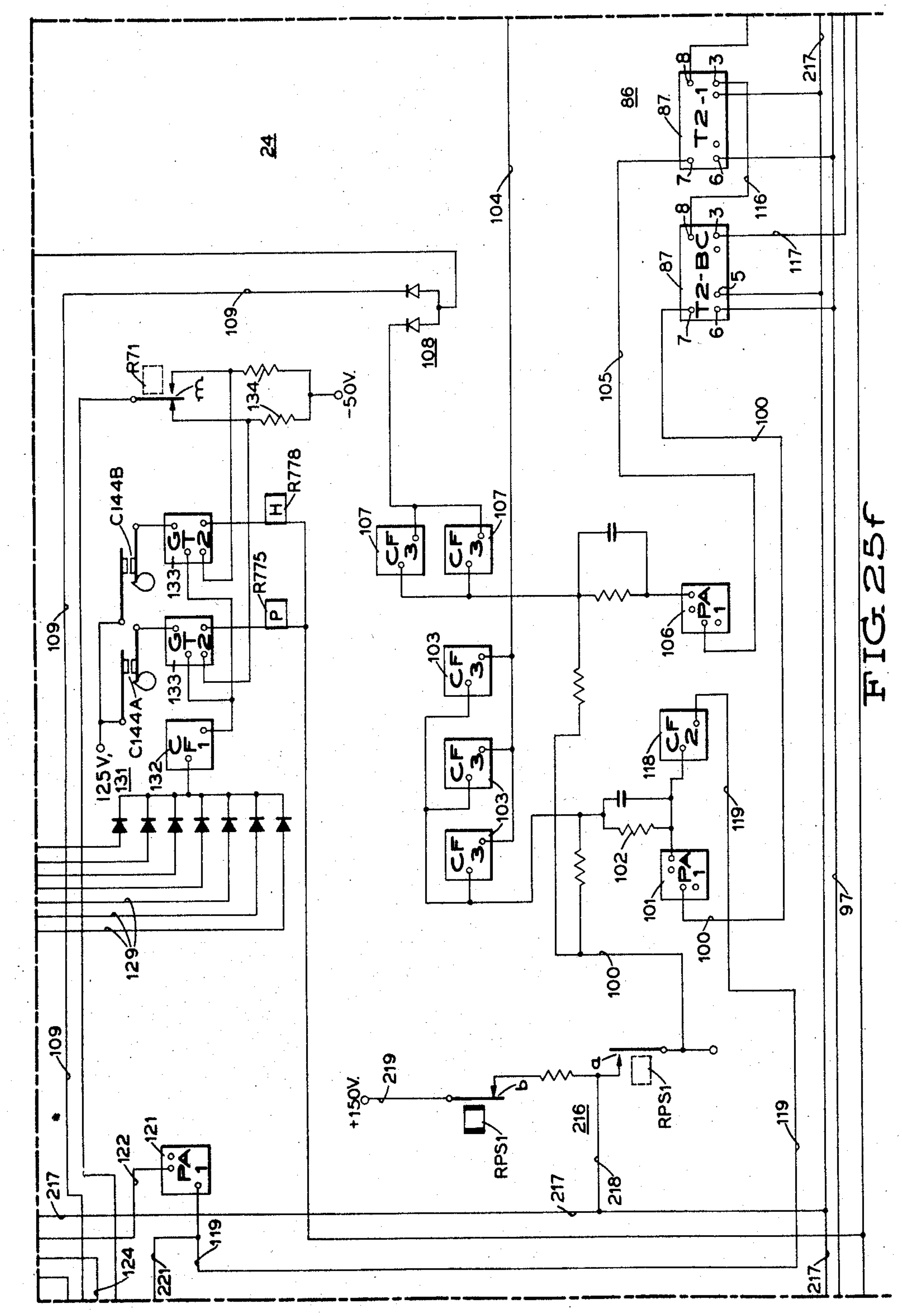
Figure 25G:
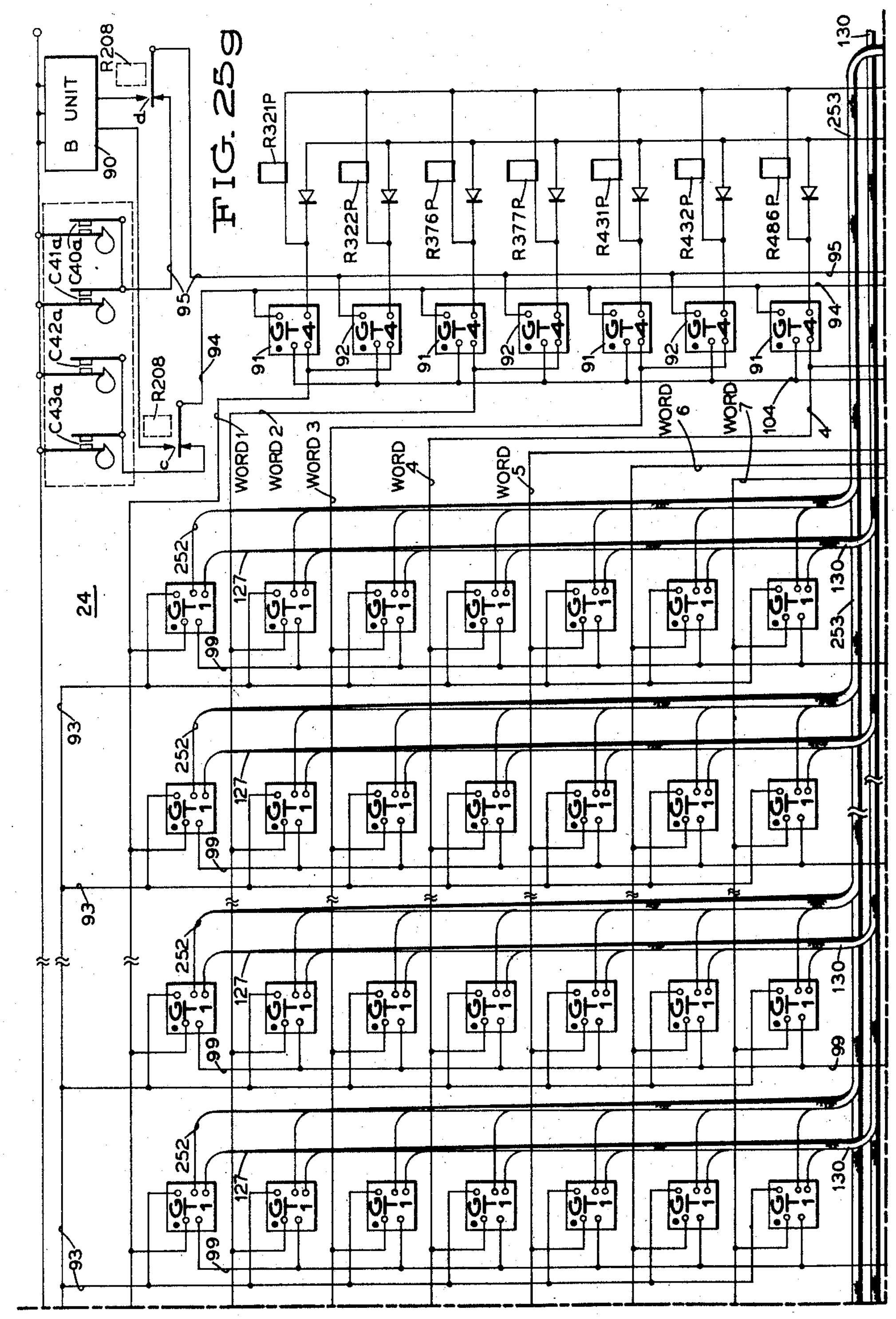
Figure 25H:
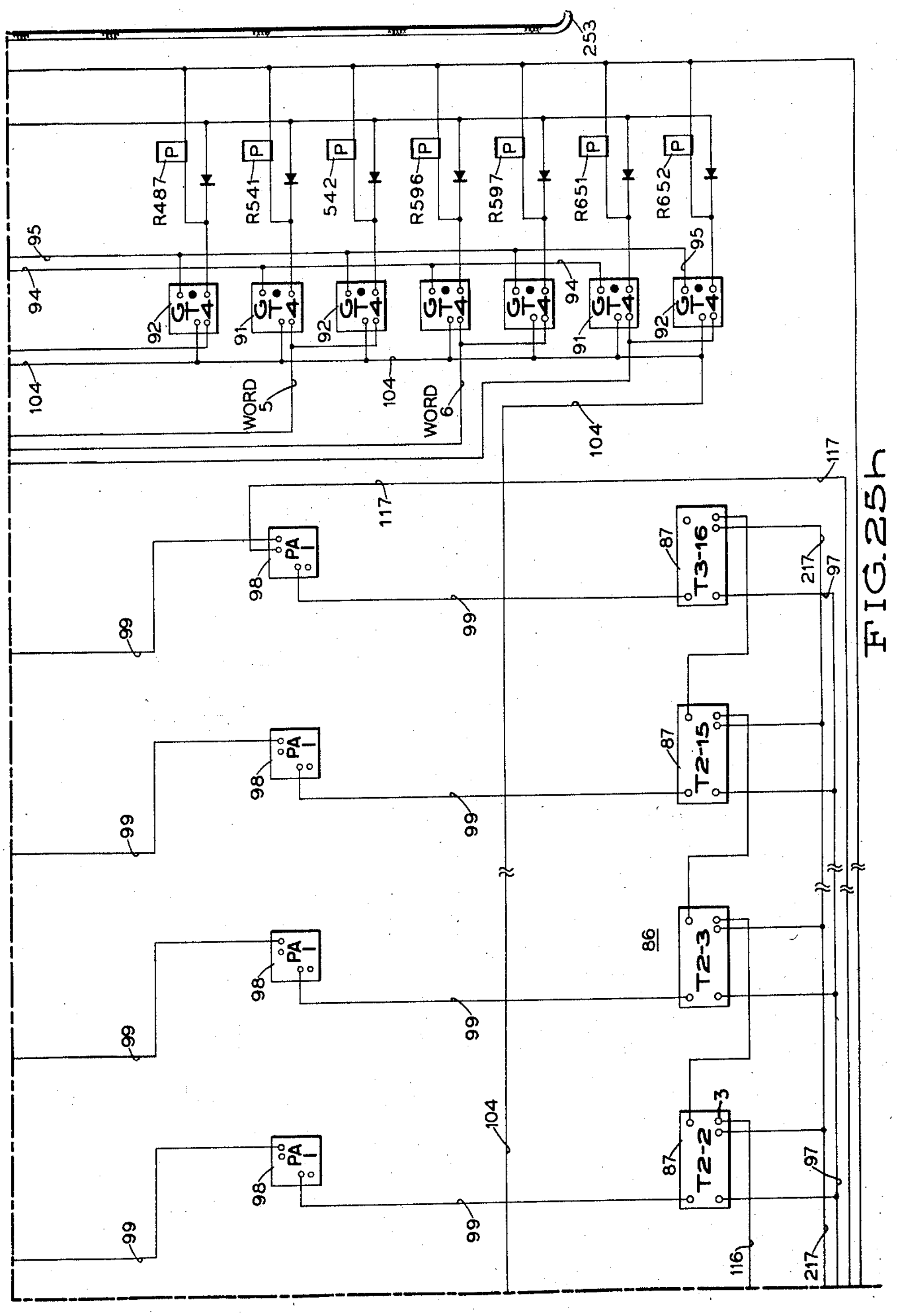

Referring to Figs. 2, 25*e*, 25*f*, 25*g* and 25*h*, the matrix 24 includes a plurality of heated cathode type gas filled tubes or print thyratrons GT1, GT3 and GT4, which are arranged in seven horizontal rows and seventeen vertical columns, a 17 position closed or fast ring 86, Figs. 25*f* and 25*h*, of sixteen T2 and one T3 triggers 87 for driving the vertical columns, an open or slow 7 position ring 88, Fig. 25*e*, of six T1 and one T3 triggers 89 for driving the horizontal rows and the combination word switch 85 connected to each row. Only six of the vertical columns and their related triggers in the closed vertical ring 86 are shown because the intermediate vertical columns are identical to vertical columns 2 to 16, inclusive.

Each horizontal row, Figs. 25*e* and 25*g*, represents a word 1 through 7 in the example given and each vertical column represents an ordered position 1 through 17 in each word at the points of intersection. Thus all 112 ordered positions of the entire line of data are represented, plus the 7 bit count positions. With this arrangement, there is provided one gas tube for each ordered position in the line to be printed. To provide the proper bit count information for each word, each horizontal row includes a pair of GT4 heated cathode type gas filled tubes 91 and 92, respectively, which are arranged in a vertical column, Figs. 25*g* and 25*h*. The gas tubes 91 are fired for a digit 1 or 1 bit count, the tubes 92 for a digit 2 or 2 bit count, and both are fired for a digit 3 or 3 bit count.

The remaining gas tubes, except for the first column which are GT3 tubes, are GT1 tubes and all have their plates connected to a positive 125 volt source by a conductor 93 under the control of master circuit breakers or cams MCA or MCB, Fig. 25*e*, operated in timed relation to the machine digit cycle points. The plates for the 1 bit GT4 tubes 91 are under control of cam contacts C43A and C42A or similar contacts in the B unit, Fig. 25*g*, through a conductor 94 and the plates for the 2 bit GT4 tubes 92 are under control of cam contacts C41A and C40A through a conductor 95 or similar contacts in the B unit. With printer A operating, the above A cam contacts provide the plate potential and cut off for all gas tubes in the tube matrix through the normally closed transfer contacts R222*c*, Fig. 25*e*, R208*c* and R208*d*, Fig. 25*g*, respectively. Under printer B operation, a similar unit 90 provides the cam control through the normally open points of the last-named transferred contacts.

In order to supply the positive drive to the control grids of the print magnet operating gas tubes, the 17 position closed drive ring 86, lower portion Figs. 25*f* and 25*h*, is driven by the previously-mentioned shift pulses supplied to a terminal 96, Fig. 25*d*, from the external source along a shift pulse line 97 in definite timed relation under the control of suitable control means to be later described.

When turned On, the negative output of each trigger in the closed vertical ring 86, Figs. 25*f* and 25*h*, except the first two, is fed through a related PA1 power amplifier tube 98 in a line 99 directly to the control grid of each gas tube in its related column. The reset position for the first or bit count trigger T2–BC, Fig. 25*f*, in the closed ring is On while all of the other triggers are reset Off. During normal operation, the bit count for each word is the first data received, therefore, the first trigger T2–BC must be On ready to receive the bit count data. The negative output of this trigger at the 7 terminal is fed over a line 100 through a PA1 power amplifier tube 101 and gating device 102 to a plurality of parallel CF3 cathode followers 103 whose outputs lead over a conductor 104 to one of the control grids of each of the bit count heated cathode gas tubes GT4, Figs. 25*g* and 25*h*. The negative output at the 7 terminal of the second trigger T2–1 is fed over a line 105 through a PA1 power amplifier 106 and a pair of CF3 cathode followers 107 to one side of a diode switch 108. Thus the application of a positive pulse to the first column of tubes is dependent upon both the trigger T2–1 being On and a predetermined condition in the initial timing means transmitted over a conductor 109 in a manner to be later described.

The drive for the seven horizontal rows of gas tubes includes the open ring 88, Fig. 25*e*, with the seven triggers T1–1 through T3–7, which when turned On, feed through related CF2 cathode followers 110 to provide a positive level to its respective word line 1–7 and provide a negative level when the related trigger is turned Off. The output of each cathode follower 110 on each word line is in series with a P2 double inverter amplifier 111 and three cathode followers 112, the output of the latter being tied to the second or shield grid of the gas tubes arranged in the related word row. In addition, each word line conditions the shield grid of the 1 and 2 bit count gas tubes 91 and 92 for that word, Figs. 25*g* and 25*h*.

Between the cathode follower 110 and amplifier 111, Fig. 25*e*, of each line is a diode 32 which cooperates with the previously-mentioned diodes to complete the word switch 85 for each word line. Thus, when any two diodes in a line are positive due to one of the triggers being turned On and a positive pulse coming from the diode switch 83, a positive bias is applied to all the gas tube shield grids in that row.

The means for providing the positive pulses to the word switches includes the previously-mentioned diode switch 83, Fig. 25*e*, which has one terminal connected to the single line 23 coming from the translator 15, Fig. 25*c* and another terminal 113, Fig. 25*e*, connected to the source of previously-mentioned gate pulses shown in Fig. 4. As mentioned, these gate pulses are inverted shift pulses of 4 microsecond duration and are continuously supplied to the diode switch 83 during the entire operation of the printer. Thus with continuous gate pulses applied to one portion of the diode switch 83 whenever a pulse is transmitted from the translator along the line 23, the combination applies a pulse to a CF1 cathode follower 114 whose output provides a positive pulse along the line 84 to the word switches 85 to condition one diode of each word line.

In operation of the matrix, the word ring 88, Fig. 25*e*, is normally reset with all triggers Off and the vertical drive ring 86, Figs. 25*f* and 25*h*, is reset with all triggers Off, except the first trigger T2–BC which is reset On. Upon the application of a negative control pulse along a conductor 115 which is dependent upon the proper operating conditions to be later explained, the slow ring trigger T1–1 is turned On and this provides a positive level to the related diode 32 in word line 1 at the first word diode switch, while the remaining word lines remain negative. At a pulse after the word trigger T1–1 is turned On, the first shift pulse on the shift pulse line 97 is gated to the vertical ring 86, Fig. 25*f*, to shift the normally On first trigger T2–BC to its Off position at its 6 terminal. This shifting to Off position provides a negative pulse to terminal 3 of trigger T2–1 through a conductor 116 to turn the same On and such action feeds a negative level to its related power amplifier 106 to supply a positive pulse to the diode switch 108 in the first column. It will be assumed that the other portion of this switch has also been rendered positive along the line 109. Thus, a positive pulse is applied to all of the control grids in the first column of gas tubes GT3, Fig. 25*e*, and under the conditions specified, the first thyratron in row 1 is the only one capable of firing if a pulse leaving the translator 15 is applied to the diodes of the word switch 85.

As the next shift pulse is applied to the shift pulse line 97, the trigger T2–1, Fig. 25*f*, is turned Off at the 6 terminal and in so doing feeds a negative pulse from its 8 terminal to the 3 terminal of trigger T2–2, Fig. 25*h*, to turn the same On. This action acts to apply a positive potential to the control grids of the gas tubes GT1 in the second vertical column, Fig. 25*g*. Of course, as this occurs, the potential on the first column of control grids is dropped and they are incapable of operation or response to a pulse arriving on the word lines. As each 4 microsecond shift pulse is applied to the vertical ring 86, Figs. 25*f* and 25*h*, it will turn the particular trigger which is On to its Off position and such action in turn turns the next succeeding trigger On in a stepping manner. After the seventeenth shift pulse is applied to the vertical drive ring 86 to turn the trigger T3–16 Off, the negative going output from its related power amplifier PA1 is conducted by means of a line 117 to the 3 terminal of the bit count trigger T1–BC, Fig. 25*f*, to turn the same to its normally On position. This completes the loop.

As the bit count trigger goes negative at its output 7 terminal, the power amplifier 101 associated therewith applies a positive potential through the cathode followers 103 to the control grids of the bit count gas tubes 91 and 92, Figs. 25*g* and 25*h*, in the vertical column through the conductor 104. At the same time a CF2 cathode follower 118, Fig. 25*f*, in series with the same power amplifier 101 applies a positive potential through a conductor 119 to the grid of a second PA1 power amplifier 121 whose negative output, by means of a parallel conductor 122, is connected to the 6 terminals of the word triggers, Fig. 25*e*, to turn the first word trigger T1–1 to its normally Off position.

Upon shifting of the trigger T1–1 to its Off position, a negative pulse through an interconnected line 123 triggers the second row word trigger T1–2 to its On position to render the second row positive upon the reception of a positive pulse through the second word diode switch 85. When the second row is rendered positive, the vertical drive ring 86, Figs. 25*f* and 25*g*, after a 4 microsecond delay, steps along in the same manner as previously described, in that the next group of seventeen shift pulses will move the triggers from the bit count's trigger T2–BC normally On position back to the point where it is turned On again.

At the end of the second complete sweep of the vertical ring, the second row word trigger T1–2, Fig. 25*e*, is turned Off in a like manner and such action will turn On the third row trigger T1–3 to repeat the same process.

Thus it can be seen that in the matrix disclosed when any row trigger T1–1 through T3–7 is On, it stays in this On position until the vertical drive ring 86, Figs. 25*f* and 25*h*, has completed a complete loop, which represents seventeen shift pulses of 4 micro-seconds up and 4 micro-seconds down and that each pulse represents an ordered position in the word.

At the end of the seventeenth pulse in the seventh word, with the emitter 21, Fig. 25*a*, in its 9 digit cycle point position, the complete scan of numeric values in the storage device has been completed and all 9's have been separated from each word and the corresponding gas tubes in the identical ordered positions for each word have been fired. As the seventh word trigger T3–7, Fig. 25*e*, is turned Off, a positive potential is applied to a line 124 which in turn charges a condenser 125, Fig. 25*d*, to pulse or drive a CF1 cathode follower 126 in a manner to be later described. The open word ring triggers 88 are now all Off and no further information is received from the storage device until the emitter 21, Fig. 25*a*, moves to its next or 8 machine digit cycle point. When this occurs, a positive potential is supplied from the diode mix 76, Fig. 25*a*, to control apparatus, to be later described, to turn On the word trigger T1–1, Fig. 25*e*, over the line 115 and the above operation is repeated for each machine cycle point.

From the foregoing it should be understood that the operation of the horizontal and vertical drive rings 88 and 86, Figs. 25*e*, 25*f* and 25*h*, respectively, for the matrix 24, Figs. 25*e* and 25*g*, is timed in synchronism with the delivery of information to the translator over the 1–2–4–8 binary lines by means of the shift and gate pulses. By way of example, assume the first binary value of the first word supplied to the translator is a 9 and that the emitter 21, Fig. 25*a*, is in its 9 digit cycle point position, indicating the start of a line of information, a negative pulse is developed on the line 23, Fig. 25*c*, which is rendered positive by the power amplifier 81 and is timed with the gate pulses applied to the diode switch 83, Fig. 25*e*. This provides a positive pulse applied to the first word switch over the conductor 84 and results in a positive pulse being applied to all grids of the first row of gas tubes including the associated bit count tubes 91 and 92, Fig. 25*g*. Under these conditions, with the trigger T2–1, Fig. 25*f*, turned On, the output at terminal 7 is negative, thus all of the control grids in the first column of gas tubes have positive values applied thereto. It can be seen that under these conditions only the first tube GT3, Fig. 25*e*, in the first word row and first column has applied thereto two positive pulses, while the other tubes mentioned have only one positive value each. Thus the first tube is fired and will conduct while the other tubes remain inactive. As soon as this tube begins to conduct, a current flows from the plate to the cathode through a normally closed contact R74A which, in this instance, leads directly by means of a conductor 127 and a cable 130 to a suitable terminal of a group of matrix exit hubs, not shown, whose function is to operate selected print magnets for initiating the printing of the data by the print wheels 860 on the paper 861, Fig. 27. This is described in the above Shafer et al. application Serial Number 469,592.

With both the translator 15 and matrix 24 synchronized, Figs. 25*c*, 25*e* and 25*g*, respectively, it can be further seen that with the emitter 21, Fig. 25*a*, at its 9 machine cycle point position and the consecutive sweeping of the gas tubes with the positive pulses, at any point where a binary 9 pulse is picked up at the decimal 9 line in the translator 15, Fig. 25*c*, the gas tube, Figs. 25*e* and 25*g*, where positive coincidence occurs with the vertical sweep is fired. This acts to set up the printing of a numeral 9 in the selected printer. With the emitter 21, Fig. 25*a*, at the 9 machine digit cycle point, the matrix 24, Figs. 25*e* and 25*g*, completes one cycle, that is, each ordered position of each word has been consecutively scanned and all 9's in each word result in firing of the related gas tube in its proper ordered position.

The same procedure is followed when the emitter 21, Fig. 25*a*, is in its 8 machine cycle point position and the matrix is again operated in the same sequence starting with word line 1 column 1 and all of the gated 8's act to fire the related gas tubes in a like manner.

As the emitter moves to its 3 machine cycle point position, it is at this time the bit count for each word, if a total of a 3 bit, is transmitted to the matrix. From Figs. 3*a* and 3*b* it can be seen the bit count arrives prior to the first ordered position of each word and while the bit count trigger T2–BC, Fig. 25*f*, is On. The firing of the bit count heated cathode gas filled tubes is operated in identically the same manner, however, the circuit breakers C41A, C42A, C43A and C40A, Fig. 25*g*, which are closed in predetermined sequences at 3, 2 and 1 machine cycle point time have control of the various plates. C43A and C42A apply a 125 volt potential to the tubes 91 at 3 and 1 machine cycle point time and C41A and C40A apply the same potential to the tubes 92 at 3 and 2 machine cycle point time. Thus at 3 machine digit cycle time all bit count tubes are capable of conducting if a 3 bit count pulse is received over the horizontal lines, however, at 2 cycle point time only the tubes 92 are energized and only the tubes 91 at 1 machine cycle point time. As each bit count gas tube is energized, it operates a related relay which in turn operates associated switching in a bit count comparing circuit 28, Figs. 25*n* to 25*r*, to be hereinafter described.

*Incomplete scan*

After complete scanning of all words in the line of data to be printed, an incomplete scan test is made. This test involves a plurality of lines 128, Figs. 25*e* and 25*f*, one for each word row which is connected to a diode mix 131, Fig. 25*f*, whose output is connected to a CF1 cathode follower 132 leading to a shield grid in a pair of GT2 heated cathode gas filled tubes 133. The control grid of one tube is connected to a 40 volt supply through normally closed contacts R71*m* during printer A operation and the control grid of the other is connected to the supply when normally open contacts R71*m* are transferred during printer B operation.

At 155° to 170° of respective machine cycle time, cam contacts C144A and C144B are closed and apply 125 volts to the plates of both tubes. If neither grid is positive, the tubes do not conduct, therefore, relays R775P and R778H remain de-energized and permit further machine operation. However, should one of the word triggers T1–1 through T3–7 in the word ring 88 be left On, due to improper operation, the related line 129 with a positive potential conducts through the diode mix 131 and both grids of the selected tube are biased positive. Thus, upon closure of the cam contacts C144A or C144B the biased tube will conduct to pick the related relay R775 or R778 to stop printer operation in a manner described in the above Shafer et al. application Serial Number 469,592. In order to insure operation of the selected tube, the control grid of the nonselected tube is biased negative by connecting the same through resistors 134 to a negative 50 volt supply.

*Control for translator, matrix and printer*

For the purpose of this description, it will be assumed that the printers are in full operation and that the various potentials necessary for machine operation are all supplied from suitable sources.

Fig. 2 shows in block diagram form the conditioning circuitry for printer operation and the controlling circuits for entry of data into the print thyratron matrix.

In order for the printers to receive the data from the storage device over the binary 1–2–4–8 lines, the printers must be in their proper cycle point positions to receive such data, and other conditions must be met; that is, the printers must be operative, a ready signal must be sent to the calculator, a selection for printer A or B must be made and the proper circuit checking must be accomplished which operates with a control pulse when the machine is at its proper machine digit cycle point to transmit a digit cycle point or row signal to the calculator to indicate that everything is in order to receive the data. When all these conditions are satisfactorily met, the data from the storage device is transmitted to the translator 15, Fig. 25*c*, groups of shift pulses are delivered to the shift pulse terminal 96, Fig. 25*d*, and gate pulses to the terminal 113, Fig. 25*e*.

The following table shows the various plugging arrangements at the control panel taps 135 and 136, Fig. 25*b*, that can be made and the printer operation that results from a print I or a print II signal:

| Control Panel Plugging | Relays Picked Up By Plugging | Calculator Signal: I | Calculator Signal: II |
|---|---|---|---|
| | | Causes Printing in— | |
| A Print I<br>A Print II | R106 R107 | Printer A | Printer A |
| B Print I<br>B Print II | R109 R110 | Printer B | Printer B |
| A Print I<br>B Print II | R107 R109 | Printer A | Printer B |
| A Print II<br>B Print I | R106 R110 | Printer B | Printer A |

For the purpose of this description, it will be assumed that the control panel is plugged so that a print I instruction will cause operation of printer A and a print II instruction will cause operation of printer B. With this type of plugging the relays R107 and R109 are energized by a line 137 extending from the 40 volt source and in so doing closes contacts R107*e* and R109*f*, Fig. 25*b*, disposed in a print test A circuit 138 and a print B test circuit 139, respectively. Since the control panel wiring is as mentioned, the relays R106 and R110 remain de-energized, therefore, the contacts R106*c* and R110*d* in the test circuits remain open. Also, the contacts R106*b* and R110*b* in the printer instruction lines remain in their normally closed position as shown.

As shown, the print I and print II signals are applied to terminals 141 and 142, respectively, and these terminals are connected to the operating point (o/p) of the contacts R110*b* and R106*b*, respectively. From the normally closed contact R110*b* a line 143 connects to a related P1 amplifier 144 whose output is connected to the 3 terminal of a T3 print A trigger 145. From the normally closed contact R106*b* a line 146 connects to a related P1 amplifier 147 whose output is connected to the 3 terminal of a T3 print B trigger 148. The normally open contacts of R110*b* and R106*b* are connected to the lines 146 and 143, respectively.

In addition to the printing of numeric data from the storage device, the printer may be instructed at random by the calculator to print a special character or characters. This instruction is designated as a "special function" and when desired, the special function signal is applied to a terminal 149. This terminal is connected to a P1 amplifier 151 whose output connects to the 3 terminal of a T3 special function trigger 152. The "special function" may be used for intermittent carriage operations, such as, double space, overflow, and so forth.

The outputs of the print A and print B triggers 145 and 148 are each connected to a related CF2 cathode follower 153 and 154, respectively, each having an output line 155 and 156, respectively. Each line 155 and 156 leads to an element of separate 4 element diode switches 157 and 158, respectively. The outputs from these diode switches lead to a diode mix 159 having a conductor 161 connected to a P1 amplifier 162, Fig. 25*d*, whose output leads to the 3 terminal of a T1 "ready-to-print" trigger 163. The output at the 7 terminal of this last-named trigger is fed to a CF2 cathode follower 164 which in turn leads to one element of a 2 element "ready-to-print" diode switch 165. In this arrangement, all of the above triggers 145, 148, 152, Fig. 25*b*, and 163, Fig. 25*d* are reset in their Off position.

With all triggers Off, the print A and B lines 155 and 156, Fig. 25*b*, leading, respectively, to cathode followers 153 and 154 are negative. This negative potential is applied by means of conductors 166 and 167 to a diode mix 168 leading to an IF inverter follower 169. The output of the inverter follower will be at a positive level due to an inversion within the unit and is directed over a conductor 171 to a terminal 172 called the "ready" line and signifies to the calculator that the printers are in operation and ready to receive an instruction.

Assuming the previously-mentioned condition where the print I signal connects to the print A trigger 145 and a print II signal to the print B trigger 148 and a print I instruction or signal is received to print in printer A, the print A trigger 145 is turned On and applies a positive potential to its related cathode follower 153 to raise the potential of the line 155. This conditions one element of the four element diode switch 157. However, the positive potential can not operate this diode switch until other conditions are met.

At the time the line 155 goes positive, due to the print I in printer A instruction, this positive level is applied by means of the conductor 166 to the inverter follower 169 which changes plus to minus and in turn causes the ready line to go down or negative so that no other print instruction signal can be received.

At the same time the line 166 biases the grid of an associated PA2 power amplifier 173 to cause conduction from the 125 volt source along the line 174 to pick up relay R39 immediately and via its contacts *c* of relay R61P, Fig. 25*d*, at 345° of the printer cycle when contacts C1A close. The energization of relay R61P will via contacts R61*a* cause the energizing of relay R43, Fig. 25*b*, at 0° machine cycle time when cam contacts C30A close. This closes the normally open contact R43*c* in the A printer test circuit 138. It will be assumed the contact R38*c*, which responds to the bit count check is closed due to proper checking in the last printing cycle. Upon closure of the contacts R43*c* in the test circuit 138, a line 175 connected to the 75 volt source renders another diode in the switch 157 positive.

In order to insure the operation of but one printer, normally open contacts R106*d*, R107*c* and R109*d*, R110*c*, Fig. 25*b*, are series parallel connected. One side of each is connected to the grids of the related print B and A amplifiers 147 and 144 through conductors 176 and 177, respectively, and the other side is connected to a negative 50 volt supply by means of a conductor 178. At the time the print I in printer A instruction is received to turn trigger 145 On, the contacts 107*c* and 109*d* are closed and contacts R106*d* and R110*c* remain open. This is normal operation. However, if a second instruction should arrive over the print II line for printer B, the normally open contacts R106*d* and R110*c* are closed. This closure of all of the contacts applies a negative potential to the grids of both related amplifiers 144 and 147 over the lines 176 and 177 and blocks the print II instruction or operation from turning On of the print B trigger 148. Thus operation of only one printer at a time is assured. If the print B trigger 148 were On, the same operation would block the operation of the print A trigger 145.

At this time it is assumed the printers are operative; that is, all normal operating conditions as to voltage have been satisfied, and due to this condition, the relay R13, Fig. 25*b*, has been energized to transfer the contacts R13*b* to supply a 40 volt potential from the line 137 through a resistor 179 to a terminal 181 which in turn is connected to the calculator (not shown). Should the printer not be operative, the normally closed contacts of R13*b* would remain closed and apply the 40 volt potential through a terminal 182 to the calculator to interrupt the delivery of the data in the storage device.

It is likewise assumed the previous bit count check was correct and that contacts R14*a* remain normal. This also supplies a 40 volt potential from the line 137 through a resistor 183 to the calculator through a terminal 184 to indicate a proper printer condition. However, if the bit count on the previous line of printed data was incorrect, the relay R14 is energized to transfer the contact R14*a* to apply the 40 volt potential to a terminal 185 to interrupt the delivery of the next line of data. Thus, the above represents two of the conditions which must be met before stored data is delivered to the translator 15.

With two of the elements of the four element diode switch 157, Fig. 25*b*, now positive, line 155 connected to one of the diodes of switch 157 and circuit 138, Fig. 25*d*, can be turned On, the remaining two diode elements in the selected switch must go positive before the "ready-to-print" trigger 163. One of the two remaining elements of this switch is connected to the 8 terminal of the special function trigger 152. With this trigger in Off position, the 8 terminal will be at a positive potential and the 7 terminal at a low or negative potential. Extending from the 8 terminal is a conductor 186 leading to a CF2 cathode follower 187 whose output is fed over a conductor 188 to a diode mix 189. The output from the diode mix leads to the grid of a CF1 cathode follower 191 whose output in turn is parallel connected to an element in each of the diode switches 157 and 158 by means of a conductor 192. In this instance, with no special function instruction or signal received from the calculator, the third element of the diode switch 157 is conditioned or rendered positive.

The remaining element of each diode switch 157 and 158 are parallel connected by means of a conductor 193 and lead to the cathode side of a CF1 cathode follower 194. The opposite side or grid of this cathode follower is connected through a 100 micro-microfarad condenser 195 to a condenser 196 which in turn is electrically tied to the decimal 9 line of the translator 15 between the 9 line trigger T4–9 and its related CF2 cathode follower 75, Fig. 25*a*. With this trigger Off, the output is negative and it can be readily seen that even if the other three elements of either diode switch 157 and 158, Fig. 25*b*, are positive, the "ready-to-print" signal cannot be transmitted to the trigger 163, Fig. 25*d*, until the emitters 21 or 22, Fig. 25*a*, are mechanically rotated by their respective printers to the 9 machine digit cycle point position and the cam contact C131A is closed. When the emitter moves to its 9 digit cycle print position at 6° machine cycle time and the trigger T4–9 is turned On, the 9 line goes positive and this value through the line 196 charges the condenser 195, Fig. 25*b*, which in turn delivers a differentiated positive pulse to the related cathode follower 194 to apply a positive value to the fourth element of the diode switch 157. It is to be noted this pulse occurs at the beginning of 9 digit cycle point time only.

When the above conditions have been met, the output of the four element diode switch 157 conducts through the diode mix 169, line 161 and amplifier 162 and turns On the "ready-to-print" trigger 163, Fig. 25*d*. Therefore, the four conditions necessary for the turning On of the "ready-to-print" trigger are: (1) Print A trigger 145 On, Fig. 25*a*; (2) carriage, print and bit count relay circuits 138 normal; (3) special function circuits correct; and (4) the selected printer at the beginning of 9 digit cycle point time.

As the 9 cycle point pulse occurs and the "ready-to-print" trigger 163, Fig. 25*d*, turns On, the 7 terminal of this trigger goes positive and its related cathode follower 164 applies a positive potential to the two element "ready-to-print" diode switch 165 and a three element diode shift pulse switch 197.

At the time the decimal 9 line goes positive and operates the diode switch 157, Fig. 25*b*, the positive potential is also transmitted by one of the conductors 77 in the translator to the diode mix 76, Fig. 25*a*, from the mix over a conductor 198, Fig. 25*c*, having in series therewith a CF1 cathode follower 199, Fig. 25*d*. The output of this cathode follower is fed over a line 201 to the other element of the "ready-to-print" diode switch 165 and the second element of the three diode shift pulse diode switch 197.

The positive pulse leaving the "ready-to-print" diode switch 165 upon coincidence is directed over a line 202 to the grid or input side of a P2 amplifier 203 to cause the same to conduct. With this tube conducing, the line 115 goes negative, Figs. 25*d*, 25*f* and 25*e*, and applies a negative potential to the 3 terminal of the first word trigger T1–1, Fig. 25*e*, to turn the same from Off to On position and thereby apply a positive potential to the first word switch 85 in the first word row to condition the same for the reception of information pulses from the translator.

The other terminal 9 of the power amplifier 203 goes positive and this positive potential is divided, one line of which conducts through a resistor 204 and is connected to a CF1 cathode follower 205 whose positive output is applied along the line 109 to condition one element of the two diode switch 108, Fig. 25*f*, disposed in the first vertical column of gas tubes GT3. However, this positive value can not energize the related thyratrons until the trigger T2–1 of the vertical ring 86 is turned On to apply plus to the other element of the diode switch 108.

The terminal 9 of the amplifier 203, Fig. 25*d*, also has connected thereto a conductor 206 including a CF2 cathode follower 207 whose output is fed over a line 208 to a terminal 209 which in turn is connected to the calculator. As the last-mentioned line goes positive, this provides the digit cycle point pulse or row signal which is directed to the calculator to signify that at this time the printer is now in condition to recive the data in the storage device. Upon the reception of this signal, the calculator is operated to supply the seven groups of seventeen shift pulses, each pulse representing an ordered position for each word, to the shift pulse terminal 96. At the same time the stored data is transmitted over the binary 1–2–4–8 lines, Fig. 25*c*, in synchronism with the shift pulses along with the gate pulses, the latter being supplied to the diode switch 83 from the terminal 113, Fig. 25*e*. During this interval the calculator is interlocked with the printer so that calculations do not take place.

As the three element shift pulse diode switch 197, Fig. 25*d*, is rendered conductive upon the reception of the first shift pulse, the output therefrom is directed to the grid of a PA1 power amplifier 210, over a line 211, whose output in turn provides a negative pulse along the shift pulse line 97 to turn the normally On bit count trigger T2–BC Off, Fig. 25*f*. Such action applies a negative pulse to the first column trigger T2–1 to turn the same to its On position and apply a positive level potential to the second element of the already conditioned diode switch 108 to apply a positive voltage to the control grids of the first column of thyratrons GT3, Fig. 25*e*, in the manner previously described. Each shift pulse causes shifting of the vertical drive ring 86 in the matrix 24 one column. Figs. 4*a* and 4*b*, show the time relationship between shift pulses and digit cycle point pulses.

After each digit of each word of the line transmitted to the translator has been scanned for the 9's, the seventh word trigger T3–7, Fig. 25*e*, is turned Off and the bit count trigger T2–BC, Fig. 25*f*, is turned On by the seventeenth shift pulse of the seventh word. Further operation of the matrix 24 is terminated until the amplifier 203, Fig. 25*d*, is again pulsed at the beginning of the next or 8 machine digit cycle point.

Each time the seventh row trigger T3–7, Fig. 25*e*, is turned Off, the terminal 8 provides a positive potential over the line 124, Figs. 25*e*, 25*f* and 25*d*, to the condenser 125, Fig. 25*d*, which in turn applies a pulse to the related cathode follower 126 whose output leads to a two element diode switch 212. However, this switch is ineffective because its other element is at a negative level.

At the end of the active 9 digit cycle point time which involves 8.9 milliseconds, the trigger T4–9, Fig. 25*a*, is turned Off by a positive pulse delivered from the cam contact C129A over the line 78 and in so doing drops the positive potential along the lines 196, 77 and 201 to open the diode switches 157, Fig. 25*b*, 165 and 197, Fig. 25*d*, respectively. This action drops the potential of the line 202, feeding the amplifier 203, to raise the potential of the line 115 directed to the first word trigger T1–1, Fig. 25*e* and drops the potential at the digit cycle point terminal 209, Fig. 25*d*, to prevent the transmission of the data from the calculator. The open word ring 88, Fig. 25*e*, then waits for the next digit cycle point start which comes at the beginning of 8 machine digit cycle point time. Each active cycle point is 8.9 milliseconds long and from the end of each active cycle point to the beginning of the next active cycle point there is a 7.6 millisecond dwell. This involves a total of 16.5 milliseconds. Since only 1.008 milliseconds is required to transmit the entire line of data from the storage device at the active cycle point time, the calculator is free to operate the remaining 15.492 milliseconds between machine digit cycle points.

It is to be noted that as the emitter 21, Fig. 25*a*, moves to its 9 position and the 9 line goes positive, the timing condenser 195, Fig. 25*b*, only applies a positive pulse of short duration, 1 to 2 micro-seconds, after which the diode switches 157 or 158 are rendered nonconductive because of the negative potential applied to the line 193. However, due to the fact the "ready-to-print" trigger 163, Fig. 25*d*, is turned On, a positive potential is maintained on its related diodes at the switches 165 and 197 throughout the entire machine digit cycle point operation.

As the emitter 21, Fig. 25*a*, moves to its 8 position, the associated trigger T4–8 is turned On and the decimal 8 line is raised in potential. This increase in potential is simultaneously fed from the diode mix 76 over the lines 198 and 201 in a similar manner to condition the diode switches 165 and 197, Fig. 25*d*, as previously described. The output of the diode switch 165 again drives the power amplifier 203 to turn the first word trigger T1–1 On, Fig. 25*e*, by means of the line 115 and sends a digit cycle point signal to the calculator at the terminal 209, Fig. 25*d*, to signify the printer is again ready to receive the same information or data. The operation of the unit is identical for the 8 digit cycle point position, however, at this time the 8's are removed from each word and the triggers are reset in the same manner.

The operation from 8 to 0 machine digit cycle points is identical to that previously described and at 0 digit cycle point time the operation is initiated in an identical manner. However, when the seventeenth shift pulse of the seventh word operates to turn the bit count trigger T2–BC, Fig. 25*f*, On and word ring T3–7, Fig. 25*e*, Off, the positive potential conducted over the line 124, Figs. 25*e*, 25*f* and 25*d*, to the condenser 125, Fig. 25*d*, provides the sharp positive going charge to the cathode follower 126 which conducts to one element of the diode switch 212 and now cooperates with a positive potential conducted over a conductor 213, Fig. 25*a* secured to the now positive decimal 0 line to conduct from the diode switch 212, Fig. 25*d*. As this diode switch begins to conduct, it is fed to the grid of a PA1 power amplifier 214 whose negative output is directed over a conductor 215 connected to the No. 6 terminal of the triggers 145, 148, 152 and 163, Figs. 25*b* and 25*d*, respectively, to turn those which are On to their Off position. This action signifies the end of the data receiving operation and removes the positive pulses to all the diode switches to render them nonconductive.

In the example given, as the print A trigger 145, Fig. 25*b*, turns Off, the lines 155 and 166 go negative and the latter acting through the inverter follower 169 applies a positive potential to the "ready" terminal 172, signifying that the printer is now ready to receive its next instruction to print in either printer A or printer B. While the "ready line" is positive, it does not indicate that a printer is ready to receive data. It only indicates to the calculator that the printers are ready to receive a print instruction. At the time all of the triggers are reset, more than half of the printing cycle and the bit count test is yet to come.

At the end of 0 machine digit cycle point time, the open word ring 88, Fig. 25*e*, is tested for incomplete scan through the cam contacts C144A or B, Fig. 25*f*, thyratrons 133, contact R71*m* and the diode mix 131 at 155–170° machine cycle time in the manner previously described.

In the event that the printer operation should be interrupted for any reason during the cycle of operation or an incomplete scan has been detected, and it is necessary to resend the data to the printer, a trigger reset circuit 216, Fig. 25*f*, is provided. This trigger reset circuit includes a line 217 connected to the No. 4 terminal of all triggers in the unit, with the exception of the bit count trigger T2–BC, Fig. 25*f*, which is connected at the 5 terminal. During normal operation, the relay RPSI is energized and this transfers the contacts RPSI*a* and RPSI*b*, Fig. 25*f*, so that a negative 100 volts is normally applied to the reset line 217 by means of the transferred contacts at RPSI*a* and a conductor 218. In case of an error, interruption or malfunction or the like, the relay RPSI is de-energized and the contacts RPSI*b* move to their normally closed position. In so doing, the normally closed contacts apply a positive 150 volts to the reset line 217 through a conductor 219 which is now connected in series with the conductor 218. When this contact transfer occurs, regardless of which triggers are turned On, they all will be turned Off, except the bit count trigger T2–BC which will be turned On, if Off.

When the bit count trigger T2–BC is in its On condition, the output at the 7 terminal reduces the potential at the grid of the tube 101 and cathode follower 118. Thus a positive potential is transmitted over the conductor 119 to a second conductor 221 leading to a diode mix 222, Fig. 25*c*. This diode mix in turn is connected to the binary 16*b* and 17*b* lines and provides a parallel positive potential to these lines at all times, except when the bit count trigger is turned Off. This latter function is a means for insuring that these lines in the translator 15 will be positive during the time the bit count, if any, is transmitted.

Fig. 4 shows the time relationship between shift pulses and gate pulses. The control grid of each gas tube is pulsed at a definite time during each word under the control of the shift pulses and is approximately 8 microseconds in duration. The shield grid is pulsed only at such time as the digit on the data lines corresponds to the printer digit time.

The print magnet operating gas tubes in the matrix 24, Figs. 25*e* and 25*g*, as the name implies, are used to energize the print magnets, not shown. The 125 volt D.C. plate voltage of these gas tubes is gated by the master circuit breakers MCA or MCB, Fig. 25*e*, which apply plate voltage only during the machine digit cycle point time. This arrangement prevents the firing of the gas tubes at any time other than at digit cycle points and also provides for the cutting off of the tubes after they have been fired and operate the print magnets and associated circuitry, not shown.

*Special function*

Returning to the print instruction circuitry, Fig. 25*b*, in the previous description, it was assumed the print I instruction in printer A had turned the print A trigger 145 On and that no special function signal was received at the terminal 149. Assuming now that the same printer instruction is received, however, it is desired to print a special character or characters or the like or cause some carriage operation. The line 155 is positive and the printer test circuit 138 is completed in the same manner as previously described to condition the two elements of the four element diode switch 157. However, the third element, representing the special function is rendered positive in a different manner.

For special function operation, the terminal 149 receives the positive special function impulse from the calculator, simultaneously with the print A instruction, and directs the same to its associated amplifier 151 whereat it is inverted and applied to the 3 terminal of the special function trigger 152 to turn the same On. This drops the positive output on the line 186 at the 8 terminal to drop the potential on the line 192 leading to the special function diodes in the switches 157 and 158, and raises the potential at the 7 terminal which is fed to the grid of a related CF2 cathode follower 224. The output from this cathode follower fires a PA2 power amplifier 225 through a conductor 226 and in so doing, picks up a special function relay R41 by completing the 125 volt circuit from the line 174.

When the special function relay R41 operates, it energizes a relay R42, Fig. 25*d*, from the 40 volt source.

The special function control panel hubs emit a continuous impulse all during the printing cycle and this pulse may be used for the operation of a plurality of selectors not shown, for the purpose of selective printing in preselected ordered positions, if desired.

As previously mentioned, with a print A or print B instruction applied to the print instruction terminals 141 or 142, respectively, the resultant operation picks either relay R36 or R37. When picked, these relays close either parallel contacts R36*b* or R37*b*, Fig. 25*b*, respectively, which are connected at one side to a positive 75 volt source by the conductor 175 and to the diode mix 189 at the other. The positive output of this mix is directed to the cathode follower 191 whose output in turn applies a positive potential over the conductor 192 to the third element in each of the diode switches 157 and 158, respectively. The fourth element in each switch is rendered positive when the printer reaches its 9 machine digit cycle point, which initiates operation as previously described.

From the above, it can be seen the special function circuit requires the receiving of a printer A or B instruction along with the special function instruction. A special function instruction by itself has no meaning to the printers and will not result in printer operation.

Each gas tube in the matrix 24, Figs. 25*e* and 25*g*, is wired in a similar manner and includes a similar transfer contact and a conductor for connecting each tube to a related exit terminal 230 at the print magnet array, not shown. For the purposes of this description and to provide proper transfer of gas tube contacts for printer B operation, a plurality of relays are utilized, Fig. 25*d*. These relays include R74, R77, R80, R83, R86, R89, R92, R96, R99 and R102, and they are all normal for printer A operation. While the points of these relays are not shown, it is to be understood the cathode side of each gas tube is provided with a normally closed and a normally open transfer contact. Thus, a complete line of information, in the absence of a special function direction, will print a total of seven words with sixteen ordered positions each and each word is separated by a blank ordered position corresponding to the bit count position. This will correspond to the timed spacing of the ordered position for the words as shown in Figs. 3*a* and 3*b*.

The present machine is provided with a printing mechanism which is adapted to print numeric data or information and a minus sign in selected ordered positions upon the energization of its related magnet at "1" machine digit cycle point time. The printing mechanism utilized is similar in construction and operation to that shown and described in E. J. Rabenda et al. Patent 2,518,063, dated August 8, 1950, and assigned to the assignee of the present invention. However, in this embodiment a slightly different pulsing arrangement for the magnets is provided and a total of 120 ordered positions or type wheels are utilized, corresponding to the number of gas tubes in the print matrix 24, Figs. 25*e* and 25*g*, plus the number of ordered positions required for proper spacing of the words.

When the printer is reset all of the triggers, relays and the like, and all of the related contacts are permitted to return to their normal operating positions for the reception of the next line of data to be delivered after the printer A and printer B selection has been made and the various related contacts are properly set up for the reception of the data.

Since the translator 15, Fig. 25*c*, the matrix 24, Figs. 25*e* and 25*g*, and the bit count circuitry 28, Fig. 1, is common to both printers, provision must be made to prevent the acceptance of additional data from the calculator before the completion of a current printing operation.

Certain relays are common to both printers and must be conditioned before the specific relays are operative. This involves the printer operative relay R13, Fig. 25*b*, check stop relay R14, bit count check R38, incomplete scan relays R775 and R778, Fig. 25*f*, trigger reset relay RPSI, the related comparing relays R321, R322, Fig. 25*g*, and others listed for each word along with checking relays and other not mentioned.

The selection or setup of the individual printers is taken care of by the "print A" relays or the "print B" relays, according to which of the printers is operated. The print A cycle relay coils R61P, Fig. 25*d*, R61 and R43, Fig. 25*b*, pick up at the beginning of a cycle and hold until 330° of that cycle. Note that these relays can not pick up unless print A relay R39, Fig. 25*b*, is energized and contact R39*c*, Fig. 25*d*, is closed, contact R102*h* is normal and the cam contact C1A is closed at 345° machine cycle time. Relay coil R39 is picked up during the time the print A trigger 145, Fig. 25*b*, is On. Relay contact R102*h* is a point of a print B relay R102, Fig. 25*d*, which, when picked, prevents the energizing of the print A relay R61 until the completion of a print B cycle. As printer A selection is made and the relays R43, Fig. 25*b*, and R61, Fig. 25*d*, operate, this action closes contact R43*c*, Fig. 25*b*, in the checking circuit 138, and closes contact R61*a* to provide the hold for the coil R61 along with others, not shown.

Thus, when the above contacts have closed along with proper setting of the above-mentioned common relays and either relay R106 or R107, Fig. 25*b*, has been operated, the A printer is ready to receive the data when it reaches 9 machine digit cycle time. Operation of the B printer is prevented by means of the opening of contacts R61*f*, Fig. 25*b*, leading to the 40 volt supply through a resistor 335, to be described later. At the end of the printer A cycles, all of the above relays return to normal and open or close their respective circuits until the next instruction from the calculator is received.

In order to provide for printer B operation, somewhat similar circuitry is used in the picking up of printer B relays. Turning On of the print B trigger 148, Fig. 25*b*, applies a positive potential over the line 167 to the grid of a power amplifier 330 which operates to pick up relay R40. The positive output of the print B trigger is also fed to the cathode follower 154 which conditions one element of the 4 element diode switch 158 over the conductor 156 and one element of a 2 element diode switch 336 over the conductor 167. The other element of this diode switch is normally under a negative 50 volt bias through a resistor element 337 to prevent operation and is conditioned to a positive level only when contact R61*f* is closed and this contact is closed only when printer A has completed its print cycle.

If printer B is to operate, the circuit is conditioned as mentioned above and at the end of printer A operation, the contact R61*f* returns to normally closed, which applies a positive potential to the second element of the diode switch 336 to cause the same to conduct. The output of this switch fires a PA2 power amplifier 338 which in turn picks up a coil RWE1 in a conductor 339 connected to the 125 volt conductor 174. Energization of this relay transfers the contacts in a mercury switch relay RWE1, Fig. 25*d*, connected to a conductor 340, leading to the 40 volt line and picks up a large number of parallel relays shown in the two columns starting with relay R71, over a conductor 341, which are called B transfer relays. These relay coils R71, R74, R77, R80, R83, R86, R89, R92, R96, R99, R102, R222, R223, R229, R742, R744 and R745 perform the function of transferring all the circuitry that is common for both machines from print A operation to print B operation.

An example for use of one such relay R71 is shown in Fig. 25*a*. Here the relay contacts R71*a* through *j* are used to transfer the input to the digit cycle point triggers T4–9 to T4–1, inclusive, from the printer A emitter 21 to the printer B emitter 22. Another example of print A and print B relays is the use of contact R43*c* and R208*b* in Fig. 25*b*. Contact R43*c* prevents the turning On of the "ready-to-print" trigger 163, Fig. 25*d*, until the print A relays are picked up. Contact R208*b* performs the same function for print B cycles.

In addition to the relays mentioned, as the relay RWE1, Fig. 25*d*, transfers all of the above-mentioned coils, the contact R102*h* in the print A cycles opens to prevent printer A from operating. The contact R102*e*, Fig. 25*a*, transfers to connect the translator trigger reset line 78 to a reset cam operated in synchronism with a cam contact C129B, not shown, associated with the B emitter 22. At 345° machine cycle time, cam contacts C1B closes to complete a circuit through now closed contacts R102*g* and R40*b* to pick coils R208P and R761P. These coils operate related contacts to close contact R208*b*, Fig. 25*b*, in the test B circuit 139, which is held by R208H, Fig. 25*d*, connected in the circuit controlled by the cam contact C139B. Contact R71*m*, Fig. 25*f*, transfers to connect one of the grids of the print B incomplete scan gas tube 133 to the 40 volt supply and cut off the A incomplete scan gas tube. The picking of coil R35, Fig. 25*d*, closes contact R35*a*, Fig. 25*j*, to energize coil R37 in the event a special function is indicated. An identical set of B unit printers 234B and associated minus sign entry, and zero coils and related cam contacts are provided which are under the control of B switches and are shown in box form in Fig. 25*j*. Since the elements are identical in construction and operation to the A printer, a further description is not deemed necessary.

At the time of transfer, the transfer contacts under control of coil R74 and others, Fig. 25*d*, are transferred at the gas tubes in the matrix 24, Figs. 25*e* and 25*g*, to connect the parallel lines 252 over the B cable 253 to set up the B print magnets, not shown.

Thus it can be seen that when printer B is in operation, the various circuits to the common elements are transferred to the printer which has been selected to receive the printing instruction.

Since the operation of the various elements, after proper transfer of contacts is identical to printer A operation, a further description is not deemed necessary.

*Summary*

Assuming the power supply is operative and the previous bit count check was correct and a complete scan of the words in the word ring 88, Fig. 25*e*, was indicated. Under these conditions the relay coils R775 and R778, Fig. 25*f*, remain de-energized, the contact R13*b*, Fig. 25*b*, indicating a printer operative condition, remains transferred to apply a signal from the terminal 181 to indicate such a condition exists and the check stop contact R14*a* remains in its normal position, which also signals the calculator over the terminal 184 that the previous bit count check was correct.

Under these conditions, all triggers are turned Off, with the exception of bit count trigger T2–BC, Fig. 25*f*, which is reset On, and bit count contacts R38*c* and R38*d*, Fig. 25*b*, in checking circuits 138 and 139 are closed.

Assuming now that the print I and print II control plugs are wired as indicated, that is, a print I signal is directed to printer A and a print II signal to printer B, and that a print I signal is applied to the terminal 141, Fig. 25*b*. With the contact R110*b* normal, the pulse is applied over the conductor 143 to the amplifier 144 which in turn provides a negative pulse to the 3 terminal of print A trigger 145 to turn the same On. As this trigger turns On, its related cathode follower 153 applies a positive potential to the conductors 155 and 166, the former conditioning one element of the 4 element diode switch 157 and the latter applying a positive potential to the inverter follower 169 to provide a negative signal at the terminal 172 to signify that the print instruction has been received and to condition a switching mechanism to prevent the reception of a second print signal. This mechanism comprises operation of the contacts R106*d*, R107*c*, R109*d* and R110*c*, as previously described.

At the same time the conductor 166 energizes the grid of the power amplifier 173 to cause conduction. This in turn operates relay coil R39 to close the contact R39*c*, Fig. 25*d*, in the print A cycle unit and as contact C1A closes at 345–0° machine cycle time, the print A cycle coil R61P is energized and operates the relay R43 to close contact 43*c*, Fig. 25*b*, in the checking circuit 138. Upon closure of this last-named contact, a second element of the diode switch is rendered positive. In the absence of a special function signal at the terminal 149, a positive potential applied over the conductor 186 passes through the diode mix 189 and cathode follower 191 whose output over line 192 conditions the third element of the switch.

Since the printers are freely running, as the emitter 21, Fig. 25*a*, reaches 9 machine digit cycle point time, its related cam contact C131A closes to apply a positive potential over the decimal 9 line to turn the trigger T4–9 On. This positive potential extends to the diodes of this line and at the same time provides a positive potential over the conductor 196 to the condenser 195, Fig. 25*b*, to apply a rapidly rising positive pulse to the cathode follower 194 which conducts over the conductor 193 to condition the final element of the diode switch 157. The output from this switch continues through the diode mix 159 over the conductor 161 and power amplifier 162, Fig. 25*d*, to turn the "ready-to-print" trigger 163 On. As this trigger turns On, a positive potential is applied to one element of the digit point diode switch 165 and to the shift pulse diode switch 197.

As the positive potential was applied to the conductor 196 to condition the diode switch 157, Fig. 25*b*, a similar potential extending from the diode mix 76, Fig. 25*a*, applies the same positive potential over the conductors 198 and 201, Fig. 25*d*, to condition the digit diode switch 165 and another element of the shift pulse diode switch 197.

At this time, the switch 165 conducts over the line 202 to operate the amplifier 203. As this amplifier begins to conduct, the conductor 115 goes negative and in so doing turns trigger T1–1, Fig. 25*e*, of the word ring 88 On. At the same time the terminal 9 of the amplifier 203 goes positive to apply a positive potential over the line 109 to the diode switch 108, Fig. 25*f*, in the first column of the matrix 24 and also applies a positive potential over the line 206 to the digit cycle point terminal 209, Fig. 25*d*, which is connected to the calculator. As the terminal 209 applies a positive potential to the calculator, this indicates that the printer is in its proper cycle point position to receive the entire line of data serially.

Upon the reception of this signal, the calculator, at its first opportunity, serially transmits the entire line of data as set forth in Figs. 3*a* and 3*b* over the binary 1, 2, 4 and 8 lines 19, 18, 17 and 16, respectively, to the translator 15, Fig. 25*c* parallel by bit, serial by digit. With the emitter 21, Fig. 25*a*, on decimal 9 line, this line is positive and any combination of 8 and 1 pulses arriving simultaneously on the lines 16 and 19, respectively, Fig. 25*c*, will condition the diode switch in this line to gate or cause conduction or apply a positive potential to the related amplifier 79. As the amplifier conducts, the line 23 goes negative which feeds to the power amplifier 81 whose output is connected to the cathode follower 82. Thus, a negative output on the line 23 adjacent the translator results in a positive output to the gate pulse diode switch 83, Fig. 25*e*. Along with the delivery of the line of data from the calculator, in the form of binary code, are a continuous series of 4 micro-second gate pulses which are applied to the terminal 113 to condition the other element of the diode switch 83 for conduction whenever a pulse representing a decimal digit is fed over the line 23.

Along with the delivery of the gate pulses to the terminal 113 are a series of inverted shift pulses which are applied at the terminal 96, Fig. 25*d*, and represent an ordered position for each word. In this example, the shift pulses are fed from the calculator in groups of seven words having seventeen shift pulses per word with a total of twelve micro-seconds delay between each word. These shift pulses condition the shift pulse diode switch 197 and feed through a conductor 211 to the power amplifier 210. The output of this power amplifier goes negative when the conductor 211 is positive to thus provide a negative shift pulse over the conductor 97 which is connected to the No. 6 terminal of all of the triggers in the closed vertical or fast ring 86, Figs. 25*f* and 25*h*.

The first shift pulse applied to the ring 86 turns the bit count trigger T2–BC Off, Fig. 25*f*, and in so doing applies a negative potential over the output conductor 116 to turn the trigger T2–1 On. As this trigger is turned On, the potential at the power amplifier 106 is increased to cause the cathode followers 107 to conduct which in turn applies a positive potential, through the conditioned diode switch 108, to all of the grids in the first column. As previously mentioned, when the amplifier 203, Fig. 25*d*, was energized the trigger T1–1, Fig. 25*e*, of the slow ring 88 was turned On to render the first word line positive. Thus, this line will conduct when a pulse is received at the line 23 to render the word switch 85 positive. As the word switch goes positive and coincidence occurs with the first word line, the output from the cathode followers 112 conditions one of the grids in each of the first word or row of gas tubes, including the first word bit count grids in the gas tubes 91 and 92.

If the first ordered position of the first word were a 9, the GT3 cathode tube is fired because both grids are positive which permits the tube to conduct. As this tube conducts, a circuit is completed through the normally closed contact R74*a* over the line 127 leading to the print entry hubs in series with a print magnet, not shown.

Upon the application of each shift pulse, the trigger in the fast ring 86, Figs. 25*f* and 25*h*, which is On is turned Off and the turning Off of this trigger provides a negative going value at the next succeeding trigger to the next order to the right to turn the same On which results in conduction of the next vertical column of gas tubes.

At the end of the seventeenth shift pulse, the trigger T3–16 is turned Off and the related power amplifier connected to the last column of gas tubes applies a negative potential over the conductor 117 to turn the bit count trigger T2–BC On, Fig. 25*f*. As the bit count trigger is turned On, the positive potential applied to the related power amplifier 101 goes negative and its positive output drives the cathode follower 118 whose output in turn is fed over the line 119 to the input of the power amplifier 121. The negative going output from this power amplifier is fed over the line 122 to the 6 terminal of trigger T1–1, Fig. 25*e*, to turn the same Off. As this trigger is turned Off, a negative potential extending over the line 123 turns trigger T1–2 On. Thus word line 2 is now conditioned for the reception of any data.

During this interval, the first group of seventeen shift pulses were delivered and as the next group of seventeen shift pulses for word 2 arrive, the fast ring 86, Figs. 25*f* and 25*h*, is stepped along in an identical manner and at the end of the seventeenth pulse, the second word trigger T1–2 in the slow ring 88, Fig. 25*e*, is turned Off and in so doing turns On the third word trigger T1–3. Thus, during the transfer when each word line is turned On in the slow ring, the shift pulse ring 86 makes one complete cycle and in doing this provides the means for stepping along the word ring 88.

Under these conditions, all decimal 9's in each word are removed and due to timing of the fast ring 86 by the shift pulses, which bear a definite relation to the ordered position of each numeric value, the related gas tube in the same ordered position is fired to set up its related print magnet in the exact ordered position, assuming the magnet entry hubs are wired in an identical manner.

At the end of the seventeenth shift pulse of the seventh word, the bit count trigger T2–BC, Fig. 25*f*, is turned On and this action turns Off trigger T3–7, Fig. 25*e*, and in so doing a positive potential is applied over the conductor 124 to condition one side of a reset diode switch 212, Fig. 25*d*.

Due to the fact the line 115 is still held negative by the amplifier 203, the first word trigger T1–1, Fig. 25*e*, can not be turned On and will thus remain Off until the first word trigger is again turned On by the cycle point pulse arriving at the next cycle point position. Thus, the matrix 24, Figs. 25*e* and 25*g*, has completed one complete cycle in which all 9's from all words have been removed.

As the emitter 21, Fig. 25*a*, leaves the decimal 9 line position, the diode switches 165 and 197, Fig. 25*d*, are biased negative over the lines 198 and 201 to prevent the arrival or passing of shift pulses. When the emitter 21, Fig. 25*a*, moves to its decimal 8 line position, the trigger T4–8 is turned On and the diode mix 76, Fig. 25*a*, again conducts over the lines 198 and 201 to condition the diode switches 165 and 197, Fig. 25*d*, to conduct in an identical manner. This action operates the amplifier 203 to again apply a negative going potential over the line 115 to turn the first word trigger T1–1 On, Fig. 25*e*, and at the same time apply a positive digit cycle point potential to the terminal 209, Fig. 25*d*, directed to the calculator. This latter signal signifies the printer is at its next or decimal 8 cycle point position and that the calculator can now transmit the same entire line of data to the translator 15, Fig. 25*c*. During this interval, the 8 line is positive while the other lines are negative, thus only pulses representing a binary 8 are removed or gated from the group of words and transmitted to the matrix to fire the proper gas tubes where coincidence of the positive values occurs between the two grids. All 8's in the binary 9 code are separated from the true 8's by means of the inverter P1 in the line 19*b*, Fig. 25*c*, as previously described under the translator operation.

The translator and matrix operation and timing is identical for all decimal positions; however, at 3, 2 and 1 digit cycle point time, the bit count trigger T2–BC, Fig. 25*f*, which conditions one grid on each bit count gas tube over the conductor 104 is in a position to cause firing of either the 1, 2 or both bit count gas tubes should the bit count value be either a 1, 2 or 3 bit.

After the entire line of information has been fed to the translator a total of ten times and all of the gas tubes fire to set up the proper numeric values in the printer, the trigger T3–7, Fig. 25*e*, is turned Off. The turning Off of the seventh word trigger T3–7 at the last shift pulse applies a positive going potential to the cathode follower 126, Fig. 25*d*, leading to the diode switch 212. This switch is now positive due to the positive potential applied over the line 213 extending to the decimal 0 digit cycle point line, Fig. 25*a*. As this switch goes positive, the power amplifier 214, Fig. 25*d*, provides a negative pulse over the line 215 to turn the "ready-to-print" trigger 163 and print A trigger 145 Off, Fig. 25*b*. This completes the cycle and signifies to the calculator by a positive potential applied by the inverter follower 169 that all of the information has been received and that the printers are now ready to receive the next instruction. However, although the printers are ready to receive the instruction, there is still the printing and checking to be done and the calculator will be restrained from sending this information, even though a selection has been made, until the selected printer reaches its 9 decimal cycle point position as previously described.

After the print A trigger 145 is turned Off, the word lines, Fig. 25*e*, are checked for incomplete scan by means of the lines 129 and diode mix 131, Fig. 25*f*, whose output, if positive, cooperates with a positive potential applied over the contacts R71*m*, depending upon which printer is operating, to fire a related gas tube to energize one of the coils R775 or R778. These coils operate to stop printer operation in any suitable manner. At the same time all the triggers are reset by opening the circuit to coil RPSI, Fig. 25*f*. This is accomplished by applying a 150 volt positive pulse to the trigger reset line 217 at the contact RPSI*b*, Fig. 25*f*. Also coil R38 is picked to open the contacts R38*c* and *d*, Fig. 25*b*, in the print test circuit. If all of the word triggers were turned Off, the incomplete scan circuit has no effect on the printing operation.

Referring back to the bit count gas tubes 91 and 92, Figs. 25*g* and 25*h*, these tubes were fired at their proper times and in so doing picked related bit count comparing coils which were held by related hold coils, not shown.

For printer B operation, a print II signal directed to the print B trigger 148, Fig. 25*b*, causes its related lines 156 and 167 to conduct. This provides the ready signal to the calculator at the ready terminal 172 and at the same time operates the power amplifier 330 to energize relay coil R40 and the line 167 conducts through the diode switch 336 to the power amplifier 337 to energize relay WE1. This transfers its contacts RWE1, Fig. 25*d*, and energizes all of the paralleled transfer coils in the line 341. This transfer of contacts sets up a transfer to the printer B for all common elements or circuitry. The operation for printer B is identical to that in printer A except that in this case the B cam contacts and other necessary printer B equipment is brought into operation.

From the foregoing, it can be seen that an improved means has been provided for receiving data in binary code from a calculator or storage device which is capable of translating this data to decimal values and to operate related print magnets in accordance with the values received.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A matrix circuit comprising a plurality of normally nonconducting tubes arranged functionally in rows and columns to represent a line of data all but one column comprising a single tube per intersection of row and column, each of said rows representing a word of data and each of said columns representing an ordered position in each word, said tubes each having an anode, a cathode and first and second control grids, an open ring of triggers, having the last trigger of the ring inoperative to control the first trigger thereof and including a normally Off trigger for each row connected to said first control grids of each tube of said row to bias the same negative, multi-element diode gating switches, one for each row connected between said trigger and said first control grids through an element of said diode switch, a conductor parallel connected to each row through another element of said diode switches, a closed ring of triggers, having the last trigger of the ring operative to control the first trigger thereof, and including a normally Off trigger associated with each column and connected to said second control grids of each tube of said column to bias said second control grids negative, means for turning said first row trigger On to condition the diode gating switch of said row for removing said negative bias from said first control grids and for applying a positive bias thereto, means for consecutively stepping said closed ring triggers On to consecutively remove said negative bias and apply a positive bias to each of said second control grids associated with each column, means for delivering a series of pulses through a conditioned diode switch of a row to apply a positive bias to said first control grids, whereby the positive row bias and positive column bias cause conduction of the tube where coincident positive biases occur, means interconnecting said open and closed rings to advance said open ring one row trigger for each complete cycle of said fast ring, a first anode circuit for all but said one column of tubes, a second anode circuit for said one column of tubes, means for opening said first anode circuit after delivery of a complete line of data has fired said tubes, and an independent cyclically operable means for opening said second anode circuit.

2. The combination as claimed in claim 1, wherein said one column includes in each row a pair of tubes, each tube having first and second control grids, said first control grids of each pair of tubes being under the control of a related row trigger, and a trigger in said closed ring for simultaneously biasing both of said second control grids of each pair in said one column, said independent cyclically operable means including a circuit breaker means for simultaneously closing and opening and then alternately closing and opening said second anode circuit to selectively control said pairs of tubes in a predetermined manner.

3. The combination as claimed in claim 2, wherein independent cathode circuits including operable means are provided for each tube in said one column, whereby said last-named means are selectively energized upon tube conduction.

4. An electronic switching circuit including a plurality of decimal lines having input ends and output ends comprising a binary to decimal translator, a plurality of binary input lines over which a line of numeric data, including a group of words having ordered positions along with the bit count thereof, is serially transmitted to said electronic switching circuit in the form of pulses or combinations of simultaneous pulses, a common conductor connecting the output ends of said decimal lines for serially transmitting a line of translated binary pulses in proper ordered relation, a plurality of tubes arranged functionally in rows and columns all but one column comprising a single tube per intersection of row and column, said tubes each having a cathode, an anode and first and second control grids, each row of tubes representing a word in the line of numeric data and each column representing an ordered position in each row, an open ring of triggers, having the last trigger of the ring inoperative to control the first trigger thereof and including a normally Off trigger for each row connected to said first control grid of each tube therein to bias the same negative, a gating switch for each row disposed between said trigger and said first control grids, means for parallel connecting said gating switches to said common conductor, a closed ring of triggers, having the last trigger of the ring operative to control the first trigger thereof and including a normally Off trigger for each column and connected to said second control grid of each tube therein to bias the same negative, means for turning said first row trigger On to condition the gating switch of said first row for removing said negative bias from said first control grids and for applying a positive bias thereto, means for consecutively turning On the triggers of said closed ring to consecutively apply a positive bias to said second control grids associated with each column, said conditioned gating switches being effective, when the translated pulses are applied thereto, to apply a positive bias to the first control grids of the associated row whereby the positive row bias and positive column bias together cause conduction of the tube where coincidence occurs, means for advancing the triggers of the open ring for each complete cycle of said fast ring, said one column comprising a pair of bit count tubes for each row arranged functionally in a column, said bit count tubes each having a cathode, an anode and first and second control grids, means for parallel connecting said second control grids, means for parallel connecting each pair only of first control grids, means for connecting said first control grids to said common conductor, a pair of parallel bit count anode circuits, each being connected to separate tubes of each pair, and means for closing and opening the bit count anode circuits in predetermined timed relationships to detect bit count values transmitted over said binary lines.

5. The combination as claimed in claim 4, wherein said last-named means closes and opens both bit count anode circuits to all pairs of tubes in the column at a preselected time interval, closes and opens the bit count anode circuit to one tube of each pair at a second time interval, and closes and opens the other bit count anode circuit to the other tube of said pair at still another interval to detect bit count values transmitted over said binary lines.

6. An electronic switching circuit comprising a binary to decimal translator and including a plurality of decimal lines having values 9–0, each having an input end and an output end, a plurality of binary lines over which a line of numeric data, including a group of words having ordered positions along with the bit count thereof, is serially transmitted to said translator switching circuit in the form of pulses or combinations of simultaneous pulses, means for selectively connecting said binary lines to said decimal lines to provide for proper equivalent numeric values, a common conductor connecting the output ends of each decimal line for serially transmitting all like translated pulses in proper ordered relation at each decimal position, a plurality of tubes arranged functionally in rows and columns, all but one column comprising a single tube per intersection of row and column, said tubes having a cathode, an anode and first and second control grids, each row of tubes representing a word in the line of numeric data and each column representing an ordered position in each row, an open ring of triggers having the last trigger of the ring inoperative to control the first trigger of said ring and including a normally Off trigger in each row connected to said first control grids of each tube therein to bias the same negative, a gating switch for each row disposed between said trigger and said first control grids, means for parallel connecting said gating switches to said common conductor, a closed ring of triggers having the last trigger of the ring operative to control the first trigger thereof and including a normal Off trigger for each column and connected to said second control grid of each tube therein to bias the same negative, means for turning said first row trigger On to condition the gating switch of said first row for removing said negative bias from said first control grid and for applying a positive bias thereto, means for consecutively turning On the triggers of said closed ring to consecutively apply a positive bias to said second control grids associated with each column said conditioned gating switches, being effective when the translated pulses are applied thereto, to supply a positive bias to said first control grids of the associated row whereby the positive row bias and positive column bias together cause conduction of the tube where coincidence occurs, means for connecting said cathode of each tube to a separate circuit, means for interconnecting said open and closed rings to advance the open ring one row for each complete cycle of said closed ring, said one column comprising a pair of bit count tubes for each row, said tubes having a cathode, an anode and first and second control grids, means for parallel connecting said second control grids of all said tubes to the corresponding column closed ring trigger, means for connecting each pair of said first control grids for each pair of bit count tubes to corresponding row triggers of said open ring, anode circuits for said bit count tubes, and circuit breaker means for closing and opening all the bit count tube anode circuits when the decimal 3 line in said translator is conditioned, closing and opening the bit count anode circuit to one tube only of each of said pairs of tubes when the decimal 2 line is conditioned and closing and opening the bit count anode circuit of the other tube only of each of said pairs of tubes when the decimal 1 line is conditioned, said tubes conducting at said times if a total bit count value of the related word is transmitted over the binary line.

7. The combination as claimed in claim 6, wherein the bit count pulse transmitted over said binary lines passes through said translator and over said common line to said matrix and over the conditioned row to said pair of first control grids for said bit count tubes.

8. An electronic switching circuit comprising a binary to decimal translator and including a plurality of decimal lines having values 9–0 and each having an input end and an output end, a plurality of binary lines over which a line of numeric data, including a group of words having ordered positions along with the bit count thereof, is serially transmitted to said translator switching circuit in the form of pulses or combination of simultaneous pulses, means for selectively connecting said binary lines to said decimal lines to provide for proper equivalent numeric values, a common conductor connecting the output ends of each decimal line for serially transmitting all like translated pulses in proper ordered relation at each decimal line position, a plurality of tubes arranged functionally in rows and columns, all but one column comprising a single tube per intersection of row and column, said tubes having a cathode, an anode and first and second control grids, each row of tubes representing a word in the line of numeric data and each column representing an ordered position in each word, an open ring of triggers having the last trigger of the ring inoperative to control the first trigger of said ring and including a normally Off trigger in each row connected to said first control grid of each tube therein to bias the same negative, a multielement diode gating switch for each row disposed between said trigger and said first control grids, means for parallel connecting said gating switches to said common conductor through an element of said diode switches, a closed ring of triggers having the last trigger of the ring operative to control the first trigger thereof and including a normally Off trigger for each column and connected to said second control grid of each tube therein to bias the same negative, means for turning said first row trigger On to condition the multielement diode gating switch of said first row for removing said negative bias from said first control grid and for applying a positive bias thereto, means for consecutively turning On the triggers of said closed ring to consecutively apply a positive bias to said second control grids associated with each column, said conditioned gating switches being effective when the translated pulses are applied thereto to supply a positive bias to said first control grids of the associated row whereby the positive row bias and positive column bias together cause firing of the tube where coincidence occurs, means for connecting the cathode side of each tube to a separate circuit, means for interconnecting said open and closed rings to advance the open ring one row for each complete cycle of said closed ring, a first anode circuit for all the above-mentioned single tubes, means for opening said anode circuit after all said words have been transmitted, said one column of tubes comprising a pair of bit count tubes for each row, said last-named tubes having a cathode, an anode and first and second control grids, means for parallel connecting said second control grid of all said bit count tubes to the corresponding column closed ring trigger, means for connecting each pair of said first control grids for each pair of bit count tubes to corresponding row triggers of said open ring, a first anode circuit connected to one tube only of each of said pairs of bit count tubes, a second anode circuit connected to the other tube only of each of said pairs, and circuit breakers in said first and second anode circuits for closing and opening both of said anode circuits when the decimal 3 line in said translator is conditioned, closing and opening said first anode circuit when the decimal 2 line is conditioned and closing and opening said second anode circuit when the decimal 1 line is conditioned, said tubes being fired upon coincidence of positive biases applied to both said first and second control grids at the above times for a bit count detection of the related word transmitted over said common conductor from said translator.

9. An electronic switching circuit comprising a binary to decimal translator, said translator including a plurality of decimal lines having numeric values 9–0, gating means secured to said decimal lines, a plurality of parallel binary lines for respectively receiving 1–2–4–8 binary code value pulses, secured to said decimal line through said gating means to provide for proper binary to decimal translation of electrical manifestations of a line of data having various numeric values, each line including a group of words having ordered positions along with the bit count thereof, if any, an emitter for consecutively applying an electrical manifestation to condition said decimal lines to in turn condition an associated gating means, a common conductor secured to each of said decimal lines, a matrix including a plurality of tubes arranged functionally in rows and columns, all but one column comprising a single tube per intersection of row and column, said tubes having a cathode, an anode and first and second control grids, each of said rows representing a word in the line of data and each column representing an ordered position in the word, an open ring of triggers having the last trigger of the ring inoperative to control the first trigger of the ring and including a normally Off trigger in each row for biasing said first control grids of each tube therein negative, means including gating means for parallel connecting said common conductor to said rows, a closed ring of triggers having the last trigger of the ring operative to control the first trigger thereof and having a normally Off trigger in each column for normally biasing said second control grid of each tube therein negative, means for turning said first row trigger On at the same time said first decimal line is conditioned by said emitter to remove said negative bias from said control grids and apply a positive bias thereto, means for applying a series of shift pulses, one for each ordered position of each word to said closed ring for turning On the triggers of said ring consecutively to thereby remove said negative bias from said second control grids and apply a positive bias consecutively to said second control grids in each tube in each column, said shift pulses being synchronized with the delivery of said coded binary pulses to said translator, each tube in an ordered position being rendered conductive upon coincidence of a positive bias from both a column trigger and a row trigger, said one column of tubes comprising a pair of bit count tubes for each row, said last-named tubes having an anode, a cathode and first and second control grids, said first and second control grids in each bit count tube being connected respectively to said row triggers respectively and to the said one column, corresponding column trigger, separate bit count anode circuits for each tube in each pair, and means for applying a potential to said bit count anode circuits in specific timed relation with said emitter, said bit count anode circuits being closed and then opened when said emitter is at decimal 3 time, one of said bit count anode circuits being closed and opened at decimal 2 time and the other at decimal 1 time to receive a bit count, if any.

10. An electronic timing circuit comprising a binary to decimal translator, said translator including a plurality of parallel decimal lines having values 9–0, gating means in each line, a plurality of binary code lines to which are applied binary manifestations, said last-named lines being selectively connected to decimal lines to provide for proper translation of a binary manifestation of a line of numeric data, each line of data including a group of words having ordered positions along with the bit count thereof, if any, an emitter for consecutively electrically conditioning said decimal lines, whereby when a line of data is serially transmitted to said translator only identical decimal values are removed from the binary equivalents, a common conductor connected to said decimal lines, leading from said translator, a matrix including a plurality of tubes arranged functionally in rows and columns, said tubes each having an anode, a cathode and first and second control grids, an open ring including a trigger in each row for selectively conditioning one of said control grids in each row, each row representing a word in the line of data and each column representing an ordered position in each word, a gating switch, one for each row of tubes and connected between said ring and said first control grids and parallel connected to said common conductor through which the translated pulses are transmitted to provide a positive control pulse to an entire row of tubes, a closed ring including a trigger in each column for consecutively biasing said second control grids positive in each column, a source of gate pulses, means applying said gate pulses to said gating switches for timing the application of translated pulses to said rows, means operative upon the conditioning of each decimal line for controlling the application of groups of shift pulses to said closed ring for driving the same and the delivery of the line of numeric data to the translator, each shift pulse representing an ordered position in the line of data, said last-named means includes switch means operative upon the energization of each decimal line by said emitter for turning the first trigger in the open ring On and to permit the delivery of binary data to the translator and the application of shift pulses to said closed ring to consecutively bias positive the second control grid of each tube in each column, said shift pulses and each ordered position for the line of data bearing a definite time and space relation, each decimal line, when energized, gates only like decimal values to set up the tubes in the matrix in the identical ordered positions, means for advancing the open ring one row for each complete cycle of the closed ring, said closed ring being rendered inactive after one complete open ring cycle until said emitter reaches its next decimal line position to condition the same for conduction and to turn said first open ring trigger On, a pair of bit count tubes each having an anode, a cathode and first and second control grids disposed in each row and conditioned thereby at said first control grids, means for conditioning said second control grid in each bit count tube once for each complete cycle of said closed ring, bit count anode circuits for said pairs of bit count tubes, and circuit breaker means for cyclically closing and opening said bit count anode circuits in timed relation when said emitter conditions the decimal 3, 2 and 1 lines, said emitter providing a control pulse for conditioning said first row and controlling the application of groups of shift pulses to said closed ring once for each word in the line of data.

11. An electronic circuit comprising a translator for translating a manifestation of a combinational code to a manifestation of a second code in which each value is represented by a single code element manifestation, including a plurality of parallel lines, one for each single code element, a plurality of translator input lines to which binary manifestations are applied, one for each element of said combinational code, means for selectively interconnecting said parallel lines and said input lines to provide proper translation of a manifestation of a line of data having a plurality of ordered positions, an emitter for consecutively energizing each of said parallel lines, a common conductor extending from said last-named lines over which translated data is transmitted as single pulses, a matrix including a plurality of rows of tubes, one tube for each of said ordered positions and each tube having an anode, a cathode and first and second control grids, means for biasing said first control grids negative and positive, a gating switch connected to said last-named common conductor and connected to said biasing means and also connected to said common conductor whereby the translated pulses are conducted to said first control grids, means including a ring of triggers, one for each parallel line in said translator, means for stepping said ring of triggers whereby said triggers consecutively bias positive said second control grid of each tube in a row once for each parallel line in said translator, means for conditioning said first control grids when the emitter reaches the first parallel line position and for gating a plurality of shift pulses to said ring to drive the same in timed relation to the delivery of data over the translator input lines, whereby when a coincidence of positive pulses are applied to said first and second control grids of any tube it conducts over a separate line, said energized tube being disposed in the same ordered position with respect to the ordered position in the line of data, said emitter being timed to permit the translation of all like values in the line of data to drive the tubes in the matrix in the same ordered position, means for controlling the delivery of the same line of data once for each parallel line to translate all like numeric values at the equivalent parallel line and conduct the same to drive the tubes in said matrix in the identical ordered position, a control line, means for biasing said control line negative at the end of ten complete scans to restrict additional delivery of data, a conductor biased positive when the emitter is at the last parallel line, a trigger for said first control grids, a conductor associated with said trigger and biased positive when said first control grids are biased negative, means operative when both of said lines are biased positive at the end of ten complete scans of the data to drive said control line to restrict the delivery of additional data and shift pulses by holding said grid conditioning means in its Off position, a pair of bit count tubes each having an anode, a cathode and first and second control grids, said bit count tubes being disposed in said row and conditioned by said first control grid when said emitter is on preselected parallel lines, means for connecting said second control grid to an element in said ring, said tubes being fired upon coincidence pulses at both control grids to operate associated bit count circuits, a separate anode circuit for each bit count tube, and means for selectively closing and opening said anode circuits when the emitter is at the preselected parallel line positions.

12. An electronic switching circuit comprising a binary to decimal translator, said translator including a plurality of decimal lines having numeric values 9–0, gating means connected to said decimal lines, a plurality of parallel binary lines having 1–2–4–8 binary code values connected to said decimal line through said gating means to provide for proper binary to decimal translation of binary manifestations of a line of data applied to said parallel lines, each line of data having various numeric values, each line of data including a group of words having ordered positions along with the bit count thereof, if any, an emitter for consecutively applying an electrical manifestation to said decimal lines to condition the same, said conditioned line gating the like numeric values over the same, a common conductor secured to each of said decimal lines, a matrix including a plurality of tubes arranged functionally in rows and columns, all but one column comprising a single tube per intersection of row and column, each of said tubes having a cathode, an anode and first and second control grids, each of said rows representing a word in the line of data and each column representing an ordered position in the word, an open ring of triggers having the last trigger of the ring inoperative to control the first trigger of said ring and including a normally Off trigger in each row for biasing said first control grids of each tube therein negative, gating means for parallel connecting said common conductor to said rows and to the open ring triggers, a closed ring of triggers having the last trigger of the ring operative to control the first trigger thereof and having a normally Off trigger in each column for normally biasing said second control grid of each tube therein negative, means for turning said first row trigger On at the same time the first decimal line of said translator is conditioned by said emitter to remove said negative bias and apply a positive bias to said first control grids, means for applying a series of shift pulses, one for each ordered position of each word to said closed ring, said shift pulses being synchronized with the delivery of the binary manifestations to said translator to consecutively bias positive said second control grids in each tube in each row, said tube being rendered conductive in an ordered position upon coincidence of positive biases upon both control grids from said column and said translator, said one column comprising a pair of bit count tubes for each row, each of said bit count tubes having an anode, a cathode and first and second control grids, said first control grids in each bit count tube being connected to said row triggers respectively and said second control grids to the triggers of said closed ring corresponding to said one column, separate bit count anode circuits for one of the bit count tubes of each pair and for the other of the bit count tubes of each pair, means for applying a potential to said bit count anode circuits in specific timed relation with said emitter to receive a bit count, if any, and means for applying gate pulses to said common line between said translator and said matrix, said gate pulses cooperating with the translated pulse on said common line to apply positive pulses through said gating means to the conditioned row in timed relation with the shift pulses for operating said closed ring.

No references cited.